(12) United States Patent
Papale et al.

(10) Patent No.: US 11,216,453 B2
(45) Date of Patent: Jan. 4, 2022

(54) DATA VISUALIZATION IN A DASHBOARD DISPLAY USING PANEL TEMPLATES

(71) Applicant: Splunk Inc., San Francisco, CA (US)

(72) Inventors: Michael Joseph Papale, Oakland, CA (US); Mark A. Groves, Monroe, WA (US)

(73) Assignee: SPLUNK INC., San Francisco, CA (US)

( * ) Notice: Subject to any disclaimer, the term of this patent is extended or adjusted under 35 U.S.C. 154(b) by 124 days.

(21) Appl. No.: 15/799,839

(22) Filed: Oct. 31, 2017

(65) Prior Publication Data
US 2018/0081935 A1   Mar. 22, 2018

Related U.S. Application Data

(63) Continuation of application No. 14/168,205, filed on Jan. 30, 2014, now Pat. No. 9,836,502.

(51) Int. Cl.
*G06F 16/245* (2019.01)
*G06F 16/248* (2019.01)
*G06Q 10/06* (2012.01)
G06F 9/451 (2018.01)
G06F 9/445 (2018.01)

(52) U.S. Cl.
CPC .......... *G06F 16/245* (2019.01); *G06F 16/248* (2019.01); *G06Q 10/063* (2013.01); *G06F 9/44505* (2013.01); *G06F 9/451* (2018.02)

(58) Field of Classification Search
CPC ......... G06F 17/30424; G06F 17/30554; G06F 9/4443; G06F 9/44505; G06F 16/245; G06F 16/248; G06F 9/451; G06Q 10/063
See application file for complete search history.

(56) References Cited

U.S. PATENT DOCUMENTS

| 8,291,334 | B1  | 10/2012 | Castellanos et al. |
| 8,423,567 | B1* | 4/2013  | Finneran ............. G06F 16/2428 707/759 |

(Continued)

OTHER PUBLICATIONS

"Splunk Launches Splunk Enterprise 5", press release from Splunk, Inc., Oct. 30, 2012. (Year: 2012).*

(Continued)

*Primary Examiner* — Beau D Spratt
(74) *Attorney, Agent, or Firm* — Perkins Cole LLP

(57) ABSTRACT

Systems and methods provide a platform of at least partially pre-defined panel templates that a user can select and manipulate to customize the visualization of data of interest within an interactive dashboard. Each panel template may be defined by a developer in advance to include a set of inputs, a query, and a visualization. Users may select pre-defined panel templates for inclusion in the dashboard, and then when the dashboard is actually displayed, use the set of inputs of a particular panel to specify criteria that may further define the corresponding query and/or the visualization of data produced by executing the query. An electronic dashboard is provided having a combination of available panel templates that may be selected and arranged according to a desired page layout or design. One or more reusable panel templates may be provided to a user of an enterprise application for data analysis and visualization.

20 Claims, 14 Drawing Sheets

(56) References Cited

U.S. PATENT DOCUMENTS

| | | | |
|---|---|---|---|
| 9,836,502 B2 | 12/2017 | Papale et al. | |
| 2002/0059293 A1* | 5/2002 | Hirsch | G06F 16/289 |
| 2003/0144868 A1* | 7/2003 | MacIntyre | G06Q 10/063 705/7.38 |
| 2003/0154177 A1 | 8/2003 | Holland et al. | |
| 2006/0288328 A1* | 12/2006 | Cross, Jr. | G06F 9/451 717/114 |
| 2007/0061428 A1* | 3/2007 | Haley | G06F 16/972 709/220 |
| 2007/0118813 A1* | 5/2007 | Forstall | G06F 3/0482 715/805 |
| 2010/0100562 A1* | 4/2010 | Millsap | G06T 11/206 707/770 |
| 2011/0214064 A1* | 9/2011 | Schneider | G06F 16/2386 715/741 |
| 2012/0023429 A1 | 1/2012 | Medhi | |
| 2012/0036484 A1 | 2/2012 | Zhang et al. | |
| 2012/0159359 A1* | 6/2012 | Ehrler | G06F 40/186 715/763 |
| 2012/0192016 A1* | 7/2012 | Gotesdyner | H04L 12/6418 714/47.3 |
| 2012/0311475 A1 | 12/2012 | Wong | |
| 2013/0086107 A1* | 4/2013 | Genochio | G06Q 10/06 707/769 |
| 2015/0168949 A1* | 6/2015 | Hua | G05B 23/0216 702/188 |
| 2015/0212663 A1 | 7/2015 | Papale et al. | |

OTHER PUBLICATIONS

Splunk Enterprise 5.0 Admin Manual, Splunk Inc., Oct. 30, 2012. (Year: 2012).*
Splunk Enterprise 5.0 Alerting Manual, Splunk Inc., Oct. 30, 2012. (Year: 2012).*
Splunk Enterprise 5.0 Knowledge Manager Manual, Splunk Inc., Oct. 30, 2012. (Year: 2012).*
Splunk Enterprise 5.0 Search Manual, Splunk Inc., Oct. 30, 2012. (Year: 2012).*
Splunk Enterprise 5.0 Splunk Tutorial, Splunk Inc., Oct. 30, 2012. (Year: 2012).*
Splunk Enterprise 5.0 Dashboards and Visualizations, Splunk Inc., Oct. 30, 2012. (Year: 2012).*
"Web template system", Wikipedia, first page, 2019.*
"Template-based application", definition, Computer Language Company, 2019.*
United States Patent and Trademark Office, U.S. Appl. No. 14/168,205, Non-Final Office Action dated Mar. 11, 2016, dated Mar. 11, 2016.
United States Patent and Trademark Office, U.S. Appl. No. 14/168,205, Final Office Action dated Aug. 18, 2016, dated Aug. 18, 2016.
United States Patent and Trademark Office, U.S. Appl. No. 14/168,205, Advisory Action dated Oct. 25, 2016, dated Oct. 25, 2016.
United States Patent and Trademark Office, U.S. Appl. No. 14/168,205, Non-Final Office Action dated Jan. 13, 2017, dated Jan. 13, 2017.
United States Patent and Trademark Office, U.S. Appl. No. 14/168,205, Final Office Action dated Jul. 5, 2017, dated Jul. 5, 2017.
United States Patent and Trademark Office, U.S. Appl. No. 14/168,205, Notice of Allowance dated Sep. 27, 2017, dated Sep. 27, 2017.
"A Guide To Creating Dashboards People Love To Use", juiceanalytics.com, Juice, Inc., Oct. 2009.
"Brightspot 2.1 Release Notes", Jan. 31, 2013.
"Brightspot 2.2 Release Notes", Jun. 11, 2013.
"Configure A Query Widget", Operations Dashboard For ArcGIS, Dec. 7, 2013.
"Configuring Widgets", Rational Solution For Collaborative Lifecycle Management Version 4.0.2, IBM Inc., Mar. 15, 2013.
"Creating A Dashboard Prompt For Filtering Oracle BI Requests", 2007.
"Dashboard—Global Filters", Jun. 6, 2011.
"Lesson 7: Variables And Dashboard Prompts", Maverick Solutions, 2012.
"Predefined Widgets In The Local Catalog", Rational Solution For Collaborative Lifecycle Management Version 4.0.2, IBM Inc., Mar. 15, 2013.
Bitincka, L., "Optimizing Data Analysis with a Semi-Structured Time Series Database", In SLAML, '10, dated Jul. 31, 2013, 9 pages.
Carasso, D., "Exploring Splunk: Search Processing Language (SPL) Primer and Cookbook", Splunk, dated Apr. 2012, 156 pages.
Palvai, "OBIEE 11g Hidden Prompts And Hiding Prompts", Oct. 20, 2012.
Yadav, "Global And Local Dashboard Prompt", Aug. 11, 2013.
"Can We Create A Common Search Template In A Form And Then Customize The Search For Different Rows In The Same Form?", Splunk—Answers, Jun. 27, 2013.

\* cited by examiner

FIG. 4D

DATA VISUALIZATION IN A DASHBOARD DISPLAY USING PANEL TEMPLATES

CROSS-REFERENCE OF RELATED APPLICATIONS

This application claims the benefit as a Continuation of application Ser. No. 14/168,205, filed Jan. 30, 2014, the entire contents of the foregoing are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure relates generally to panel templates for visualization of data within an interactive dashboard, for applications of a distributed enterprise system.

BACKGROUND

An increasing number of computing applications, particularly within the enterprise environment, may involve analyzing large amounts of data generated by distributed devices and systems. Such data analysis may include generating reports that present the data using different types of visualizations including, but not limited to, tables, graphs, charts, or timelines. Some reports are generated from data collected from a plurality of distributed nodes by a single aggregating node for analysis. The analyzed data may relate to a particular application or service, e.g., an operating system, visualization software, a messaging service, security service, etc., provided within an enterprise data network, or the data may relate more broadly to performance of an enterprise's applications or IT operations or the security of the enterprise's computers or computer networks. To monitor or troubleshoot any issues related to the performance of the particular application or service, data may be collected from the nodes associated with that application or service within the enterprise data network, and displayed through an interface, such as a website or client application.

Enterprise users, such as system administrators or data analysts, may have access to various data analysis tools for creating and editing reports and visualizations of data related to the operation of a particular application or system within the enterprise. Conventional data analysis tools generally require such enterprise users to either use a default set of visualizations provided by an application developer or create their own custom visualizations. However, some enterprise users may not find the combination of visualizations provided in a default set to be particularly useful for their needs. Also, custom visualizations may not be a viable option for these users, if they happen to lack the expertise or time required to create such visualizations.

SUMMARY OF A FEW EMBODIMENTS OF THE DISCLOSURE

The present disclosure relates to a platform of at least partially pre-defined panel templates that a user can select and manipulate to customize the visualization of data of interest within an interactive dashboard. In one embodiment, each panel template may be defined by a developer in advance to include a set of inputs, a search (e.g., a "query" or "search query"), and a visualization (or set of visualization parameters). Users may select pre-defined panel templates that each define a panel for inclusion in the interactive dashboard, and then when the dashboard of user-selected panels is actually displayed, use the set of inputs of a particular panel to specify criteria that may further define the corresponding query and/or that may alter the visualization of data produced by executing the query. Thus, embodiments of the present disclosure also relate to, among other things, an electronic dashboard having a combination of available panel templates that may be selected and arranged according to a desired page layout or design. In one embodiment, one or more reusable panel templates may be provided to a user of an enterprise application for data analysis and visualization. The user may select any combination of such panel templates to create a customized dashboard including the selected combination of panels.

According to certain aspects of the present disclosure, a panel may include a visualization of data based on the execution of a query, which in certain embodiments also may be included as part of a definition of the panel. Accordingly, the query (or query results) may be used to drive the visualization of data for a particular panel. Each panel also may include one or more inputs that may be used to constrain the query or manipulate the data visualization driven by the query, e.g., by changing a format or type of the visualization. According to certain aspects, the inputs for a given panel may be populated based on, for example, values in a predefined list or the results of a parameterized search. A developer may provide the predefined list or a command for the search via, for example, a configuration file or a command line interface. In some embodiments, a graphical user interface (GUI) also may be provided for enabling the user to specify values of developer-defined inputs via a control element (e.g., a search box, field, chart, table, or list) within the GUI. The GUI also may enable the user to arrange, organize, or change visual properties (e.g., a size or position) of one or more panels displayed within the dashboard.

According to certain aspects, each input of a panel may have a desired scope. For example, a panel may include a local input that applies only to that particular panel. Any changes to the value of such a local input would affect only the panel to which it applies. Additionally or alternatively, a panel may include a global input that applies to that panel and one or more other panels within a dashboard page. In contrast with a local input, any changes made to a global input would affect all of the panels to which it applies. In some embodiments, the panels may benefit from being defined by both local inputs (e.g., inputs specific to a particular panel) and global inputs (e.g., inputs applicable to two or more panels in the interactive dashboard). Values entered by a user for one or more of the local and global inputs may be used to define the search for data to be visualized or may be used to affect the format of the visualization of the data.

According to certain aspects, the scope of an input for a panel may affect whether or not that input is displayed within the panel itself. For example, a local input for a particular panel may appear as a UI or control element within a window or frame of the panel itself, as displayed within the dashboard page. However, in some cases, the dashboard may merge or otherwise create a single user element for entering a global input shared by a plurality of panels within the dashboard, enabling the user to specify a value for the global input once for all panels. Thus, a global input that applies to multiple panels (e.g., two or more)

within a dashboard page may be represented by a single UI or control element, which may be displayed within a designated area of the dashboard page, e.g., in a top or other global portion of the window above the panels. This arrangement may enable a user to specify or select a global input value (e.g., from a dropdown list control element displayed within the dashboard) once for all of the panels to which that input applies.

According to certain aspects of the present disclosure, user-selected panels may be added to a dashboard page by reference, e.g., by reference to a corresponding panel definition using a name, identifier, or tag. Such a modular design and "by-reference" relationship between the definition of each panel and the dashboard page to which the panel is referenced may enable changes to be made to the definition and/or visualization parameters of one panel without having to also make changes to any of the other panels or an entire page of the dashboard in which the panels are displayed. The modular design of the panels added to a dashboard page also enables the user to control the placement and organization of the panels within the page, as desired for a particular page layout. In certain embodiments, the visualized data may include and/or be based on time-series data, machine data, log data, network data, network packet data, sensor data, performance measurements on IT components, and/or events derived or rendered from such data.

Each of the embodiments disclosed herein may include one or more of the features described in connection with any of the other disclosed embodiments. It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIGS. 4A-4G illustrate different views of an exemplary interface for creating a customized dashboard page having panel templates added to the page and arranged according to a desired layout or page design.

DETAILED DESCRIPTION

Figure 1:
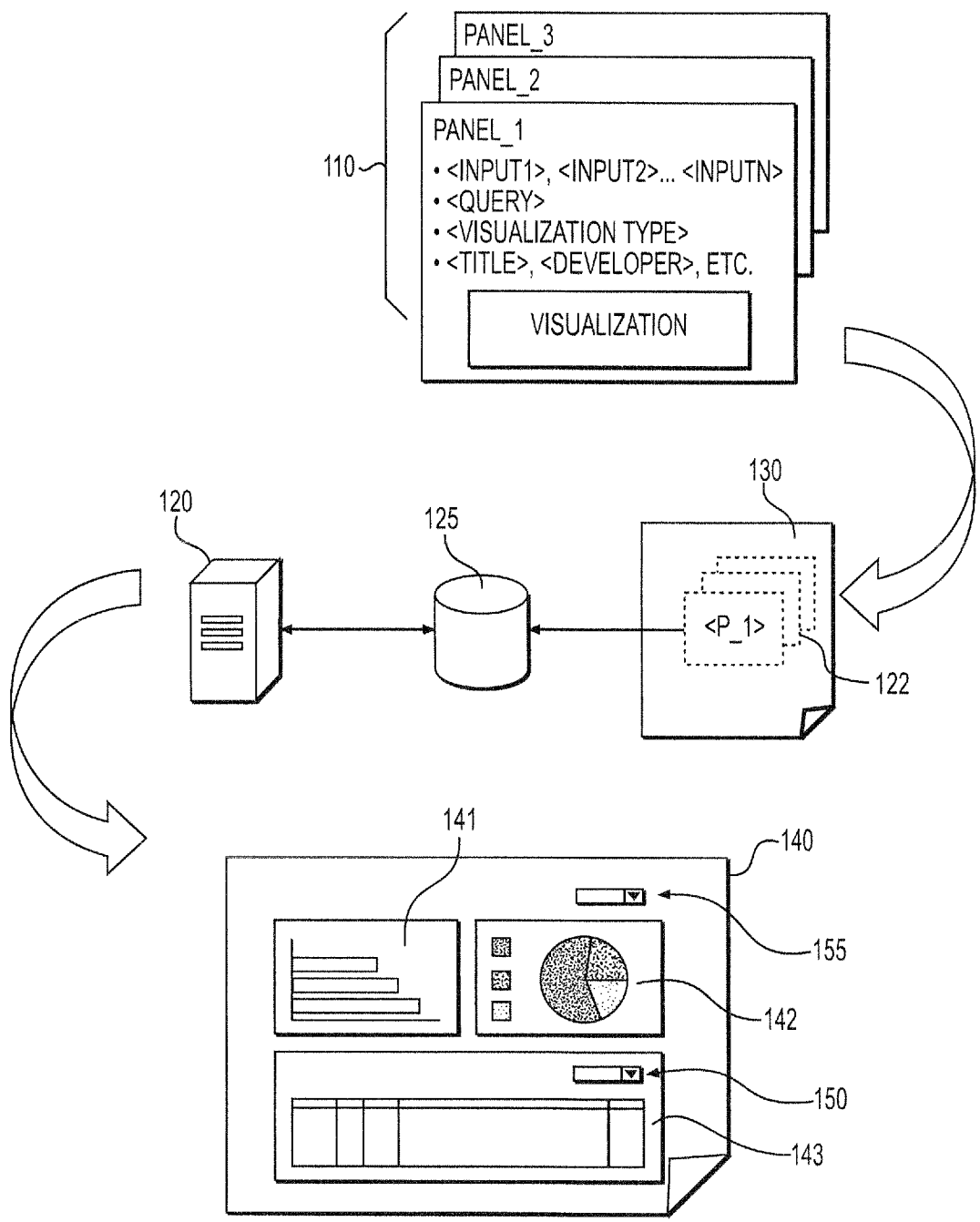
FIG. 1 illustrates a schematic diagram of an exemplary arrangement for providing and selecting reusable panel templates for defining a dashboard page including a combination of panels, in accordance with an embodiment of the present disclosure.

The present disclosure relates to systems and methods for providing panel templates by which users of an enterprise application may create a customized view of different aspects of a distributed enterprise system. Such a user-customized view may be in the form of, for example, a customized overview page (also referred to herein as a "dashboard page" or "dashboard") including a combination of one or more panels selected by the user and arranged according to a desired page layout or design. In one embodiment, one or more reusable panels may be provided to a user of an enterprise application for data analysis and visualization. The user may select any combination of such panels to create a virtual dashboard or overview page including the combination of panels selected to show desired data. Each panel may include a visualization of data resulting from the execution of a query that also may be included in a definition of the panel (also referred to herein as a "panel template"). Accordingly, the query (or query results) may in some cases be used to drive the visualization of data for a particular panel.

The definition of each panel also may include one or more inputs that may be used to constrain the query or manipulate the data visualization driven by the query, e.g., by changing a format or type of the visualization. Each input of a panel may have a particular scope. For example, a panel may include a local input that applies only to that particular panel. Any changes to the value of such a local input would affect only the panel to which it applies. Additionally or alternatively, a panel may include a global input that applies to that panel and one or more other panels within a dashboard page. In contrast with a local input, any changes made to a global input would affect all of the panels to which it applies.

In some embodiments, each of the panels may be implemented as a separate component or configurable object related to different aspects of a data management system of the enterprise. The different aspects may correspond to, for example, different functional categories of servers or component systems within the overall data management system. As described above, a third-party developer or provider of the software and services associated with the particular enterprise data management system may provide a default set of visualizations (e.g., panels) within a predefined dashboard page that may be selected for use by end users. Alternatively, such users may develop their own visualizations by creating panel definitions programmatically.

As will be described in further detail below, embodiments of the present disclosure may help to alleviate the issues imposed by such conventional visualization techniques by providing panels in the form of reusable templates or components that may be used to recompose a default page layout with a chosen combination of panels. Such reusable panel templates enable a user to recompose a default dashboard provided within an application into a customized dashboard including a combination of panels selected by the user. Each user-selected panel may be added to a dashboard page by reference, e.g., a reference by name or identifier, to a corresponding panel definition. Such a by-reference relationship between the panel and the dashboard page may allow changes to be made to the panel's definition without having to make any changes to other panels on the page or the page as a whole. The modular design of the panels also enables the user to control the placement and organization of the panels within the page, e.g., as desired for a particular page layout or design.

Exemplary Embodiments

FIG. 1 depicts a schematic diagram of an exemplary embodiment for providing panel templates (also referred to as "panel definitions") for defining panels that can be selectively added to a dashboard page, in accordance with an embodiment of the present disclosure. As shown in FIG. 1, in general, a set of panel definitions 110 may be defined and added to a dashboard page definition 130, either in their entireties or by reference. For example, the particular set of panel definitions 110 may represent an available set of panels or a selection of panels made by a user from a plurality of panels provided or made available within an enterprise application. The enterprise application in this example may provide data analysis and visualization functionality related to a particular system of the enterprise. The user may be, for example, a data analyst or system administrator of the enterprise. While only three panels are shown in FIG. 1, it should be noted that any number of panels might be provided to the user.

In one embodiment, as shown in FIG. 1, each panel definition 110 may include one or more inputs (e.g., "<INPUT1>, <INPUT2>", etc.), a query (e.g., "<QUERY>"), a selection of a visualization type, and one or more panel identification parameters, such as a title, reference ID, creation date, developer, etc. As will be described in more detail below, each of the one or more inputs may be any type of parameter that modifies the result of the search query specified in the panel definition 110. For example, the one or more selected inputs of each panel definition 110 may enable users to tune the search query that drives the visualization generated for each panel definition 110. In one embodiment, inputs of each panel definition 110 may be provided for each panel definition by a machine and/or by a developer, whereas values for the provided inputs may be provided entirely or in part by an end user.

In certain embodiments, the search query of each panel definition 110 may be a query against data, in some cases using parameters provided by one or more of the selected or provided inputs. In certain embodiments, the search query of each panel definition 110 may be a query against machine data and/or log data, as will be described in more detail below. However, the search query of each panel definition 110 may be for any type of data desired to be displayed in a visualization panel. In one embodiment, the "visualization type" of each panel definition 110 may be a selection of one of a plurality of visualization types, such as one of: a bar chart, a line chart, a pie chart, results table, single values, maps, and so on. Alternatively, or additionally, the "visualization type" of each panel definition 110 may include a selection of one more additional visualization parameters, such as colors, scales, fonts, sizes, themes, etc.

In one embodiment, each page definition 130 may include one or more references 122 to a panel definition 110 corresponding to each desired panel that is added from the set of available panels. Thus, each page definition 130 may include a "by-reference" relationship from the page to one or more panel definitions, enabling changes to each panel definition without upgrading each page that references a particular panel. In the example shown in FIG. 1, the panel definitions 110 for the set of available and/or selected panels may be stored within a data store 125. Data store 125 may be any type of recording medium used to store different types of data including, but not limited to, panel definitions 110 for the available and/or selected panels, and/or any other panels (not shown). The panel definitions 110 may be stored in any of various formats. An example of such a format includes, but is not limited to, an extensible markup language (XML) based format suitable for representing such panel definitions.

In some embodiments, such a format allows each panel template to be defined as a reusable component or object within the enterprise application. For example, different panels may be associated with different parts of the enterprise application, e.g., different dashboard pages that may be provided "out of the box" or by default within the application. Accordingly, the panels and corresponding definitions may have been created by a third-party developer of the particular application. However, an end user of the enterprise application may select different panels to be recombined and added to a new dashboard page, which may be customized by the end user according to a desired page layout or design.

In some embodiments, each panel definition 110 may be stored in association with a unique name or identifier. Thus, each reference 122 for each panel definition 110 within the page definition 130 may be, for example, the corresponding name or identifier of the particular selected panel or panel definition. Alternatively, each reference 122 may take the form of a tag or a pointer to each corresponding panel or panel definition. As shown in FIG. 1, a computing device 120 may be configured to parse the page definition 130 and use each reference 122 included within page definition 130 to find the appropriate panel definition 110 for each panel template desired to be added to the dashboard page. In some implementations, a lookup table including a list of panel names or identifiers mapped to memory locations may be used to find and retrieve the panel definition 110 for each panel referenced within the page definition 130.

Further, each panel definition 110 stored in data store 125 may include a selected data visualization type, a query that provides the data for the visualization (e.g., a search string), and optionally one or more inputs that may constrain the query and/or control aspects of the visualization. For purposes of illustration, FIG. 1 depicts how the panel definitions 110 for the set of selected panel templates may be used by computing device 120 to generate an exemplary dashboard page 140 including corresponding panels 141, 142, and 143 with the appropriate visualization for each panel.

As described above, each input of a panel may have a defined scope (e.g., local or global). In some embodiments, the scope of a panel's input may affect whether or not that input is displayed within the panel itself. For example, a local input for a particular panel may appear as a control element 150 within a window or frame of the panel itself, as displayed within panel 143 of the dashboard page 140. However, a global input that applies to multiple panels (e.g., panels 141, 142, and 143) may be represented by a single control element 155, which may be displayed within a designated area of the dashboard page 140, e.g., in a top portion of the window above the panels. This arrangement may enable a user to specify or select a global input value (e.g., from a dropdown list control displayed within the dashboard) once for all of the panels to which that input applies. In certain embodiments, the definition of an input as either global or local may be manually selected by a developer who creates a panel definition. Alternatively, a global or local nature of an input may be detected automatically based on whether the input matches an input of another panel in the dashboard, as will be described in more detail below.

In one embodiment, the inputs for a given panel may be populated based on, for example, values in a predefined list or the results of a parameterized search. The developer may provide the predefined list or a command for the search via, for example, a configuration file or a command line interface. In a further embodiment, a GUI may be provided for enabling the user to specify values for inputs via a control element (e.g., a search box, field, or dropdown list) within the GUI. The GUI also may enable the user to arrange, organize, or change visual properties (e.g., a size or position) of each panel displayed within the dashboard.

Figure 2:
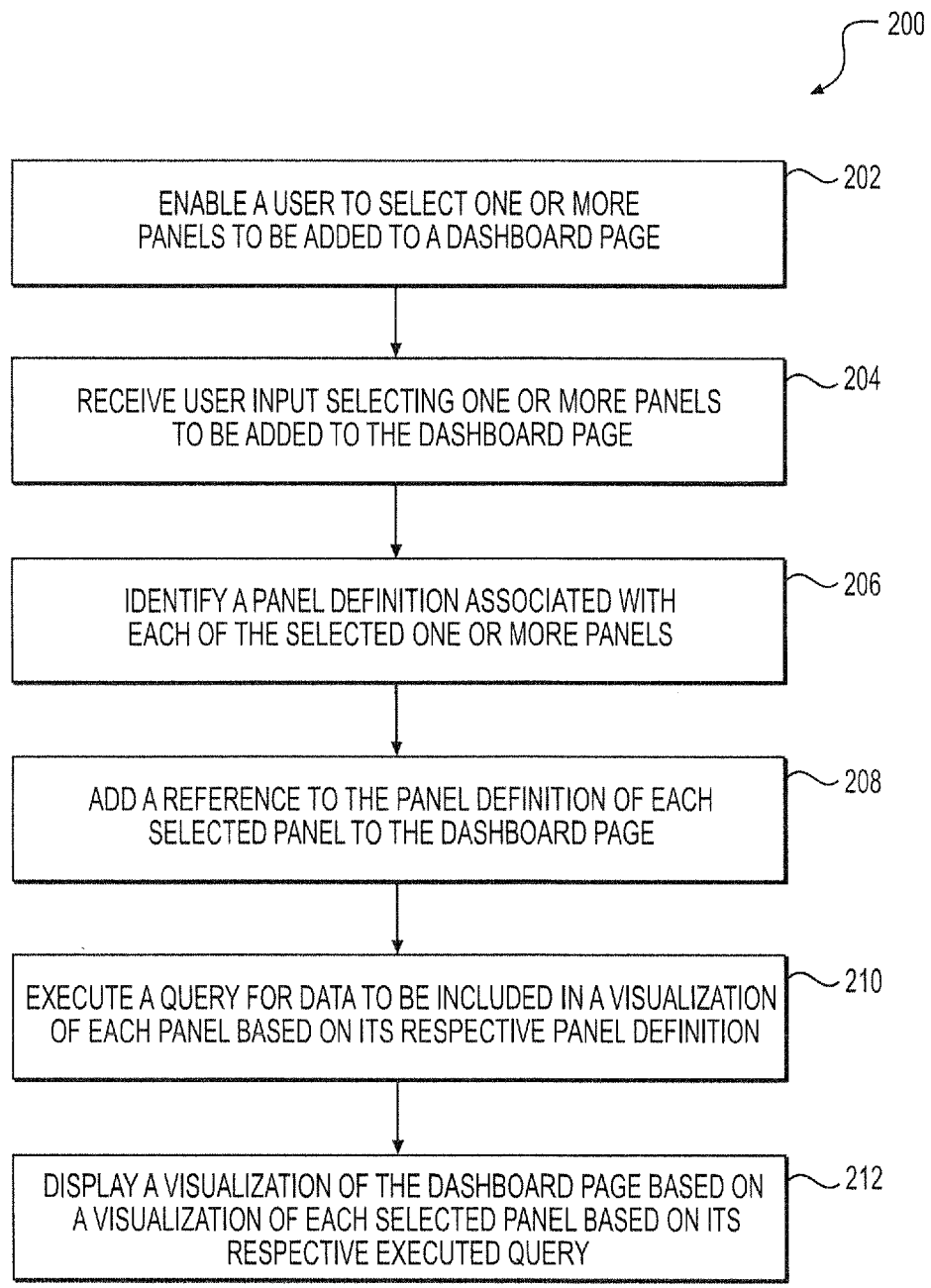
FIG. 2 is a process flowchart of an exemplary method for enabling a user to create a custom dashboard page having a combination of user-selected panels arranged according to a desired layout or design.

FIG. 2 is a process flowchart of an exemplary method 200 for enabling a user to create a custom dashboard page having a combination of user-selected panels arranged according to a desired page layout or design. As shown in FIG. 2, method 200 includes enabling a user to select one or more panels to be added to a dashboard page (step 202). Specifically, step 202 may include providing any type of interface (e.g., a GUI or command line interface) enabling a user to select one or more panels for inclusion in a dashboard. In one embodiment, the interface may be a web-based editor, which may be displayed in the form of a dashboard-creation page that provides a plurality of panels that the user can select from to add to a design surface that allows the placement and organization of panels within the dashboard page layout. In an example, such a dashboard-creation page may be displayed through a separate user interface from that of the dashboard generated using the dashboard-creation page.

Accordingly, the dashboard-creation page in this example may be displayed to a user as part of a dashboard design feature or tool of an enterprise application or software tools suite and the dashboard page may be displayed as part of a reporting feature of the enterprise application. Alternatively, the dashboard-creation page and generated dashboard of user-selected panels may be presented, for example, within different views displayed through a single user interface of an enterprise application. As will be described in further detail below, the interface (e.g., for a dashboard-creation page) may enable the user to specify the panels or panel definitions for each panel to be added to the dashboard, along with various other properties related to the visual layout and format of each panel to be displayed within the dashboard page.

As shown in FIG. 2, method 200 may therefore include receiving a user input selecting one or more panels to be added to the dashboard page (step 204). In an embodiment, method 200 may include receiving an indication of an order of the user-selected panels to be added to the dashboard page through such an interface, and the dashboard page may be displayed including the panels in the indicated order. In a further embodiment, method 200 may include receiving an indication of a size and/or position of each panel within the dashboard page, and each panel may be displayed within the page according to the indicated size and/or position. As described above, the interface may be any type of GUI that may enable the user to arrange, organize, or change visual properties (e.g., a size or position) of each panel displayed within the dashboard by manipulating a representation of each panel within the GUI using a user input device (e.g., a mouse or other pointer device, touch pad, touch-screen display, etc.). For example, in certain embodiments, a user may employ a "drag-and-drop" gesture to move available panels onto a dashboard.

As described above, each panel may include, for example, a visualization of data to be displayed based on the results of a query. Each panel also may include a set of inputs that may constrain the query or control the type or format of the visualization. Examples of different types of visualizations that may be used for a panel include, but are not limited to, charts, tables, event lists, and maps. Examples of the different types of charts that may be supported include, but are not limited to, a bar chart, a line graph, a scatter plot, a pie chart, and any other type of chart suitable for data analysis and visualization. In certain embodiments, one or more of the above parameters may be defined entirely or partially by a panel definition of each selected panel.

Thus, in response to receiving input from the user selecting one or more panels to be added to the dashboard page (step 204), method 200 may further include identifying a panel definition associated with each of the selected one or more panels (step 206). As described with respect to FIG. 1, in certain embodiments, the identified panel definition may specify one or more inputs, a visualization type, a query, and so on.

Method 200 may further include adding a reference to the identified panel definition of each selected panel to the dashboard page (step 208). It should be appreciated that, in some cases, the panel definition itself may be added to the dashboard page. However, as described above, by adding a reference, pointer, tag, or any other identifier of the panel definition to the dashboard (as opposed to the panel or panel definition itself), any pages referencing the panel or panel definition may be updated automatically by updating the panel definition.

Method 200 may further include executing a query for data to be included in a visualization of each panel based on its respective panel definition (step 210). In other words, step 210 may include executing a search for data to be included in a visualization of each panel within the dashboard page. As described above, the query may be defined, either in whole or in part, by the panel definition. The query may be partially defined by one or more inputs included in the panel definition and/or one or more inputs selected by a user. In one embodiment, the query may take the form of a search string or a pipeline command. In certain embodiments, the query may include one or more commands affecting the panel visualization. For example, one or more commands of the query, such as a final command of a pipeline command, may include a selection of a visualization type.

Method 200 may include displaying a visualization of the dashboard page based on a visualization of each selected panel based on its respective executed query (step 212). Specifically, step 212 may include displaying within the dashboard page the one or more panels generated based on the executed query and the set of inputs identified for each panel. In some embodiments, the definition of each panel added to the dashboard may include a base search to provide initial results for the visualization. In such an example, such a base search may be executed and the search results may be returned when the dashboard is loaded. In a further example, the set of inputs associated with a particular panel or multiple panels within a dashboard page may be used to modify the search (e.g., post process the search) in order to extract and highlight different information from the search in the panels.

Figure 3:
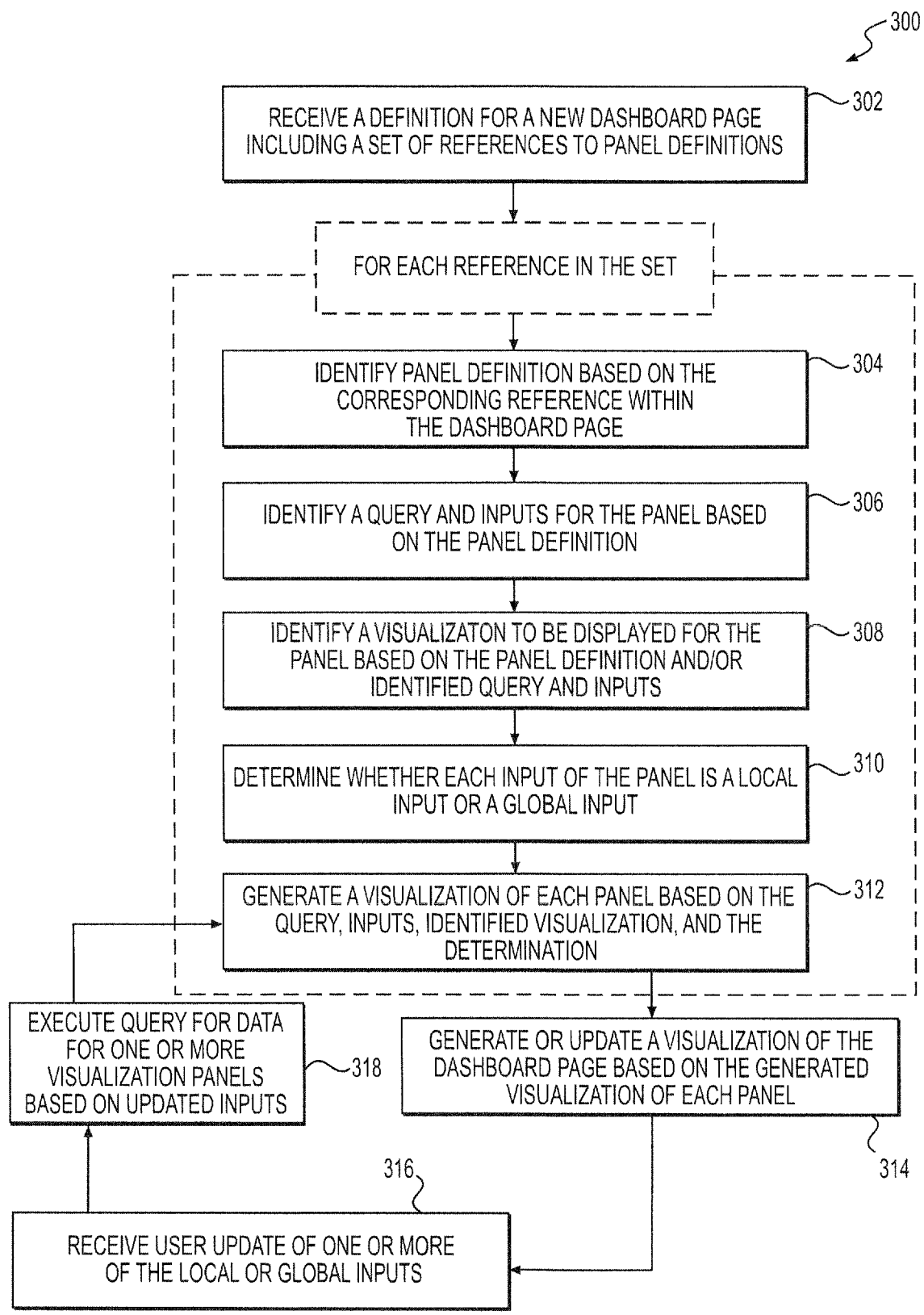
FIG. 3 is a process flowchart of an exemplary method for generating a visualization of a dashboard page based on visualizations of panels generated from associated panel definitions.

FIG. 3 is a process flowchart of an exemplary method 300 for generating and updating dashboard visualizations based on panel definitions selected to be added to a custom dashboard page. As shown in FIG. 3, method 300 may include receiving a definition for a new dashboard page including a set of references to panel definitions (step 302), such as according to the page creation method of FIG. 2. For example, method 300 may include receiving a dashboard page definition 130 including a plurality of references 122, each reference 122 being to a panel definition 110 and having been associated with the received page definition 130, e.g., via a user interface of an enterprise application, as described above with respect to the steps of method 200.

For each reference in the set, method 300 may include identifying a panel definition (step 304) based on a corresponding reference included within the page, e.g., as part of the page definition. For example, a computing system may parse the received dashboard page for references to panel definitions, and on encountering each reference to a panel definition, may look-up the reference in a data store, look-up table, or the like, to identify its associated panel definition. As described above, each panel definition may include a query, one or more inputs, and/or a visualization type and/or visualization parameters.

Method 300 may then include identifying a query and inputs for the panel based on the identified panel definition (step 306). For example, step 306 may include parsing the identified panel definition to identify a search string or other query information included in the panel definition. As described above, the query may have been pre-programmed into the panel definition by a developer of the respective panel definition. Step 306 may optionally include parsing the identified panel definition to identify one or more inputs, one or more of which may be an input to the query of the panel definition, or other parameters affecting the visualization of the panel. As described above, the inputs may have been defined for the panel definition by a developer, for the purpose of soliciting values for the inputs from an end-user.

Method 300 also may include identifying a visualization to be displayed for the panel (step 308) based on the identified panel definition, and/or the identified query and/or inputs. Specifically, as described above, in certain embodiments, each panel definition may include a selection of a visualization type and/or of one or more pre-defined visualizations, such as a bar chart, table, etc. Thus, step 308 may include parsing the panel definition for one of the selected pre-defined visualizations or types. Step 308 also may include parsing the panel definition for other parameters that affect the panel visualization, such as the query (e.g., one or more commands in a pipeline query) and/or one or more of the inputs. In one embodiment, the visualization may not be entirely identified until a query is executed for data to be visualized. For example, a panel definition may include a base query that may be executed to identify an initial data set to be included in the panel. In certain embodiments, the inputs of the panel may be used to constrain the query or manipulate the visualization, as described above.

Further, as described above, a scope of each input for each panel may be determined (step 310), e.g., to determine whether each input is a local input or global input. For example, as described above, a local input for a particular panel may appear as a control element or module within a window or frame of the panel itself, as displayed within the dashboard page. However, a global input that applies to multiple panels within a dashboard page may be represented by a single control element, which may be displayed within a designated area of the dashboard page, e.g., in a top portion of the window above the panels. As the control elements required by each panel may be a part of the panel's definition, the scope of each input of the panel may affect the panel definition to be added to the definition of the dashboard page.

In certain embodiments, the definition of an input as either global or local may be manually selected by a developer who creates a panel definition. That is, in the process of defining the query, visualization type, visualization parameters, inputs, etc., the developer may also define whether each input is local, i.e., private to the panel of interest, or global, i.e., able to be combined or merged with a corresponding input of another panel in the dashboard. As a result, a computing system may merge matching inputs between two or more panels based not only on their having matching input characteristics, but also based on the developer having identified the inputs as being opted-in for treatment as a global input.

Alternatively, a global or local property of an input may be detected automatically based on whether the input matches an input of another panel in the dashboard, independent of a developer input. That is, a developer might not necessarily define each input as being either global or local. In this embodiment, a computing system might automatically merge the inputs of two or more different panels in a dashboard into a single global input if the input options are the same. For example, if two or more panels in a dashboard have the same input options (e.g., a dropdown menu enabling the selection of either option A or option 8), then a computing system may combine the UI or control elements for that input into a single input common to the two or more panels dependent on that input. In certain embodiments, whether defined by a developer or automatically detected as being global, global inputs may be included in a panel definition as a reference, pointer, or tag to a corresponding global input UI or control element, such that all panels including the reference to the global input UI or control element (i.e., panels that are dependent on the global input) may be automatically updated with any inputs provided through the global input UI or control element.

Method 300 may further include generating a visualization of each panel (step 312) based on the query, inputs, identified visualization, and the determination of the scope of each input of the panel. As described above, in certain embodiments, an initial visualization of each panel may be generated based on execution of a base query for data to be initially visualized in the panel.

Method 300 may further include generating and/or updating a visualization of the dashboard page based on the generated visualization of each panel (step 314). For example, method 300 may include assembling a dashboard page, whether via a GUI of a client application or a web page of a web-based dashboard service, based on each of the generated visualization panels. Moreover, method 300 may include generating the visualization of the dashboard page based on the user's selection of an order, position, size, shape, color, or other appearance parameters, selected for one or more of the visualization panels.

Method 300 may further include, upon generating and displaying the generated visualization of the dashboard page to the user, receiving a user input to provide and/or update one or more of the inputs (step 316). As described above, the one or more inputs may impact one or more of the visualization panels, whether through the query or directly via visualization parameters, and based on whether each input is a local input (i.e., for a particular panel) or a global input (i.e., for more than one panel).

In the event that a user's input and/or updating of an input changes the query used to identify data displayed by the visualization, then method 300 may further include executing the query of the panel definition for one or more visualizations based on the provided or updated inputs (step 318). It should be appreciated that the query may be executed dynamically, i.e., in real-time, based on the user's manipulation of the one or more inputs. Moreover, execution of the query for each panel may depend on whether an input has been provided or updated in a way that would cause the panel's visualization to include different data. For example, if a provided user input only modifies a visualization parameter or an input affecting a first panel's query, then method 300 may avoid re-executing a query of a second panel. By contrast, if a provided or updated user input is global or at least common to two or more panels, then method 300 may include dynamically re-executing the query of each panel dependent on the provided or updated global input. Of course, each time a query is re-executed such that it updates the data to be visualized, method 300 may include again generating a visualization of each panel for which new data is now available (step 312), based on the results of re-executing the panel's query, as well as its inputs, identified visualization, and so on. Likewise, each time a visualization panel of a dashboard page is updated, method 300 may include updating a visualization of the dashboard page based on the updated visualization panels (step 314). However, it should also be appreciated that each visualization panel of a dashboard may be updated automatically based on a dynamic, real-time updating of its respective query, and that in some cases, active steps to re-generate a particular visualization panel or the dashboard as a whole may not be necessary.

According to certain embodiments, each visualization panel can be defined in isolation, or in other words, independent of the definition of other visualization panels or of a dashboard page. For example, the author of a panel, e.g., an application developer, can define the global and local inputs, the query or search, and the visualization of data to view the results of the query, without knowledge of any other panel being defined within the system.

By way of example, in one illustrative embodiment, the enterprise application subject to the presently disclosed techniques may be for an e-mail exchange or messaging system of an enterprise (e.g., Microsoft Exchange system). A user in this example may choose to add two different panels using a dashboard-editing feature of a GUI or other type of interface provided to the user within the application. One panel may be for an Exchange mailbox panel and the other may be for an operating system Event log panel. The Exchange panel and the Event log panel may each include a global input that allows the user to select from a list of computer hosts. In this case, the matching global inputs, e.g., the computer host inputs from each panel, may be combined into one user control element, e.g., a selector control, for the user. The resulting user experience enables the user in this example to select from a list of computers running Exchange and retrieve the knowledge of the mailboxes and the event logs for the selected machine.

In some implementations, a visualization displayed within a panel may allow the user to select a data point that can be treated as an input for another panel included within the page. In the Microsoft Exchange example above, the visualization of a first panel may include a list of servers displaying Exchange mailbox information. The user's selection of a given server within the first panel may be used as an input to drive a search within a second panel, e.g., which may show detailed error information from the selected server. However, it should be noted that the present disclosure is not intended to be limited to the Microsoft Exchange or other e-mail or messaging applications or systems and that the techniques disclosed herein may be used for other types of applications.

Figure 4A:
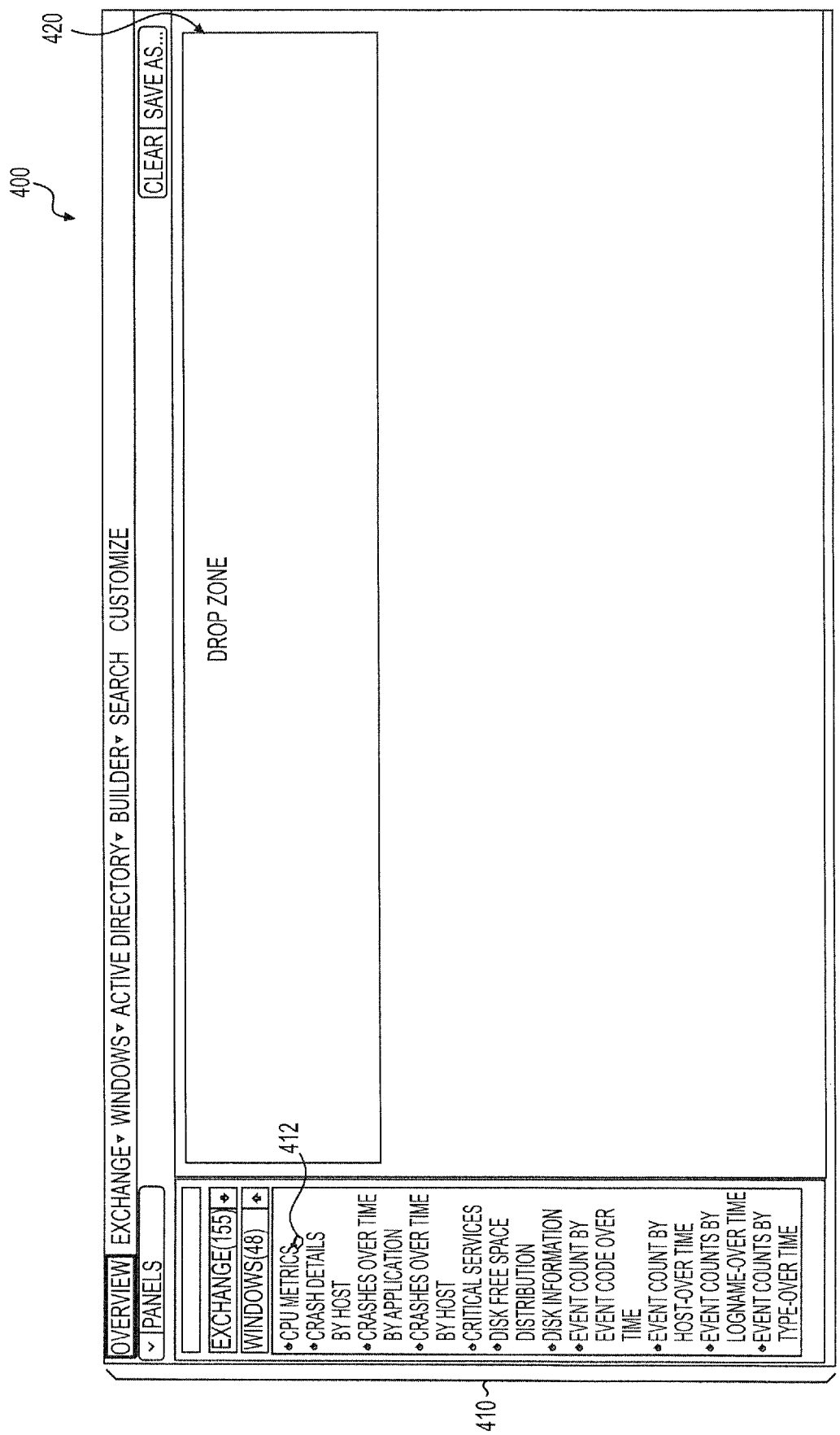
Figure 4B:
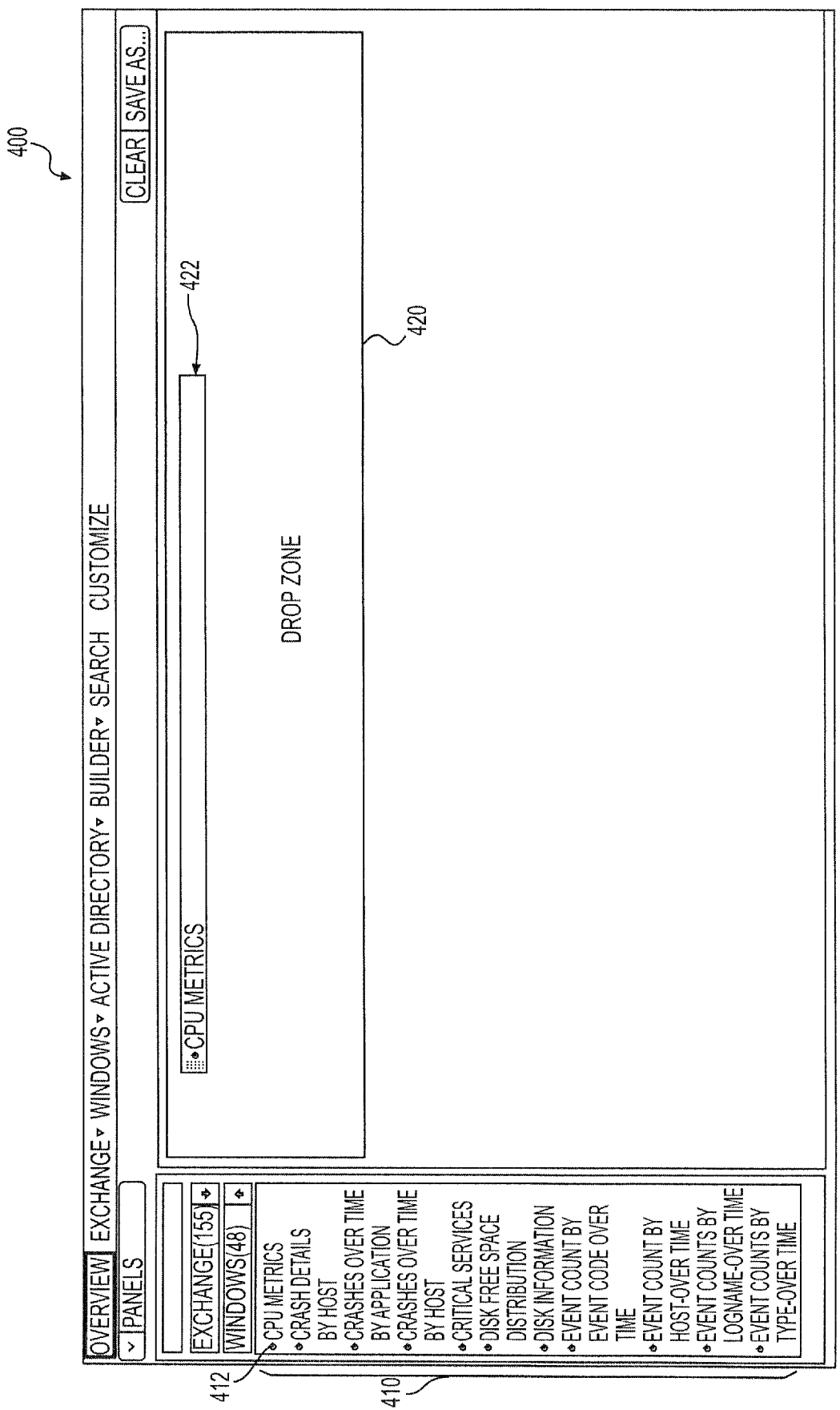
Figure 4C:
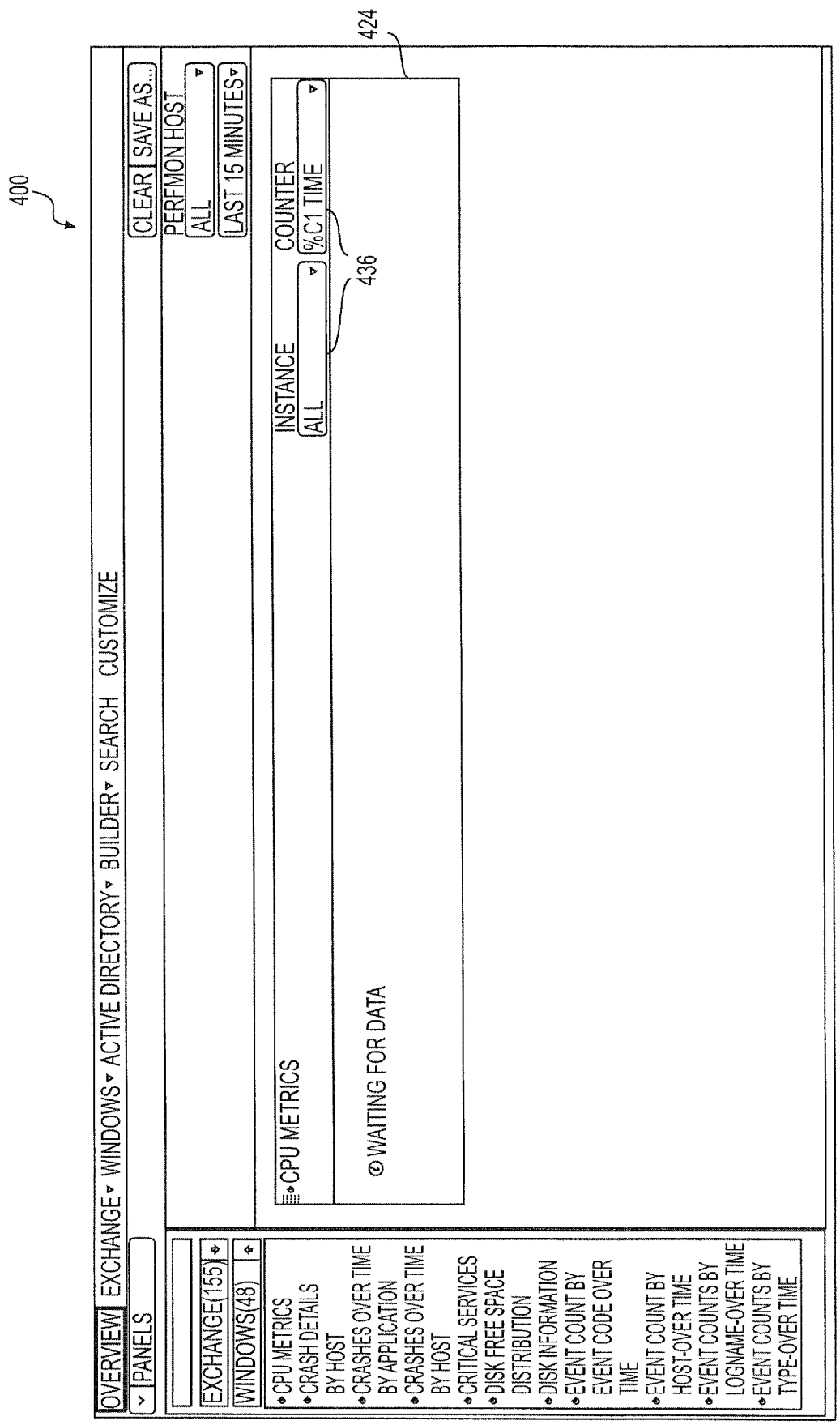

FIGS. 4A-4G illustrate different views of an exemplary GUI 400 for creating a customized dashboard page having pre-defined panel templates that may be added to the page and arranged according to a desired page layout or design. As shown in FIG. 4A, GUI 400 includes a list of available panel templates 410 (including, for example, a panel indicia 412 titled "CPU Metrics") and a design area (or "drop zone") 420. A user may use an input device (e.g., a mouse or other pointer device) to select and add a panel from the list of panels 410 to drop zone 420, e.g., by using a drag-and-drop gesture, as shown in FIG. 4B. In FIG. 4B, the example panel indicia 412, titled "CPU Metrics," has been selected and dragged to drop zone 420 by the user. Once the user "drags" the panel indicia 412 into the drop zone 420, panel indicia 412 may begin to take the form of a visualization panel 422, as shown in FIG. 4B. Once the user "drops" or otherwise adds the selected panel to drop zone 420 (such as by "un-clicking" or releasing a mouse, etc.), the visualization panel 422 may expand into visualization panel 424, as shown in FIG. 4C. This process may include loading the panel definition, which may include, for example, a title of the panel, a query, a set of inputs, and a visualization to be included within the panel. As shown in FIG. 4C, visualization panel 424 may, in some cases, very briefly display "waiting for data," "running search," or the like, to reflect that the query of the loaded panel definition is being executed to identify data to be visualized in the panel definition. As described above, it should be appreciated that the query may be a base query executed before or immediately upon the panel being selected for inclusion in the dashboard.

Figure 4D:
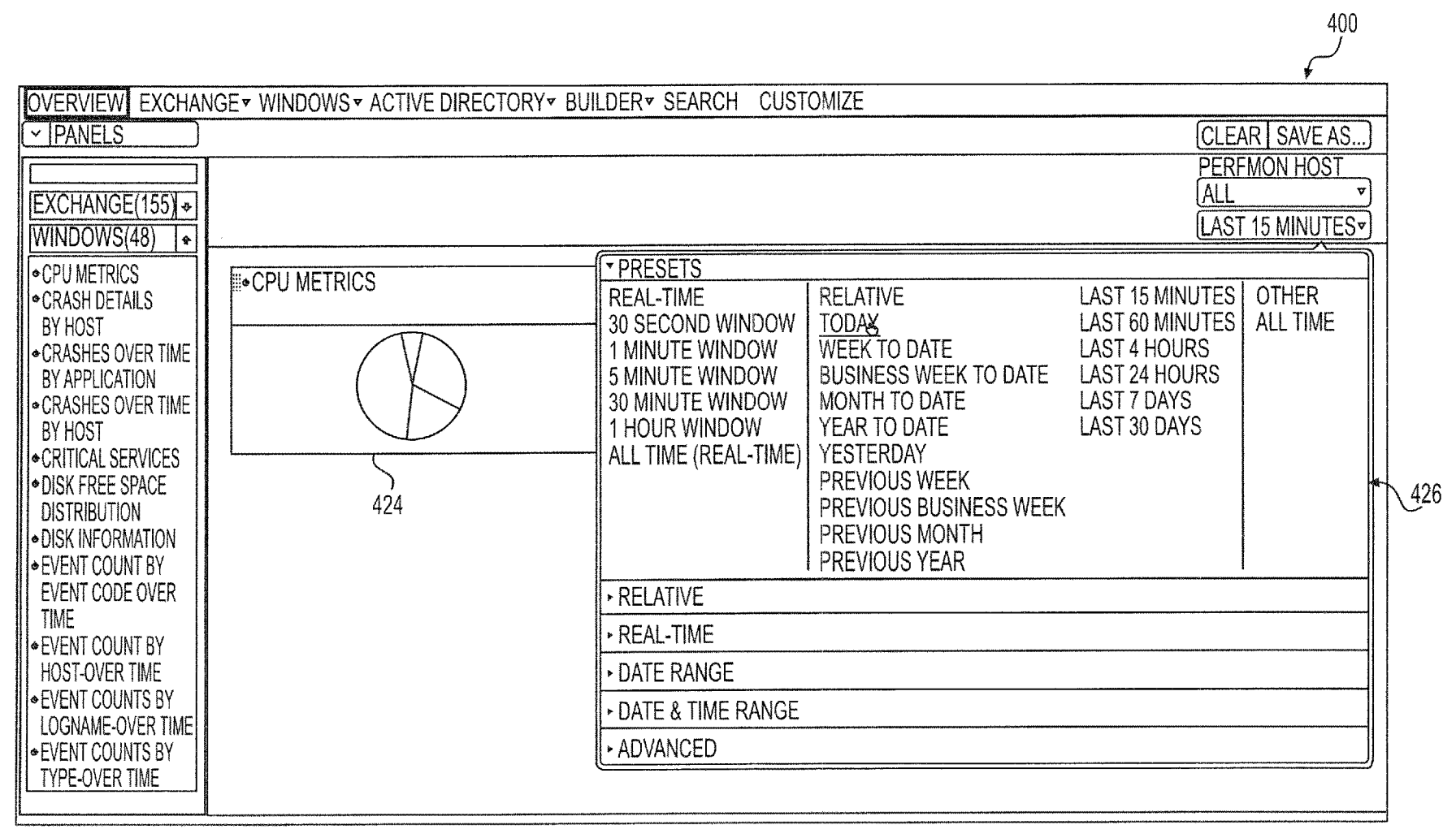

As shown in FIG. 4D, a representation of the visualization panel 424 (in this case, a pie chart) then may be displayed within GUI 400 based on the loaded definition and the results of the executed query defined by the loaded definition. In some embodiments, the query for the panel may be executed when the panel is loaded and the query is identified from the panel definition, as described above. In addition, a visualization of data based on the query results may be generated for display within the panel. As also shown in FIG. 4D, the user may specify one or more constraints (e.g., time constraints) for the query by making a selection via a selector control 426.

Figure 4E:
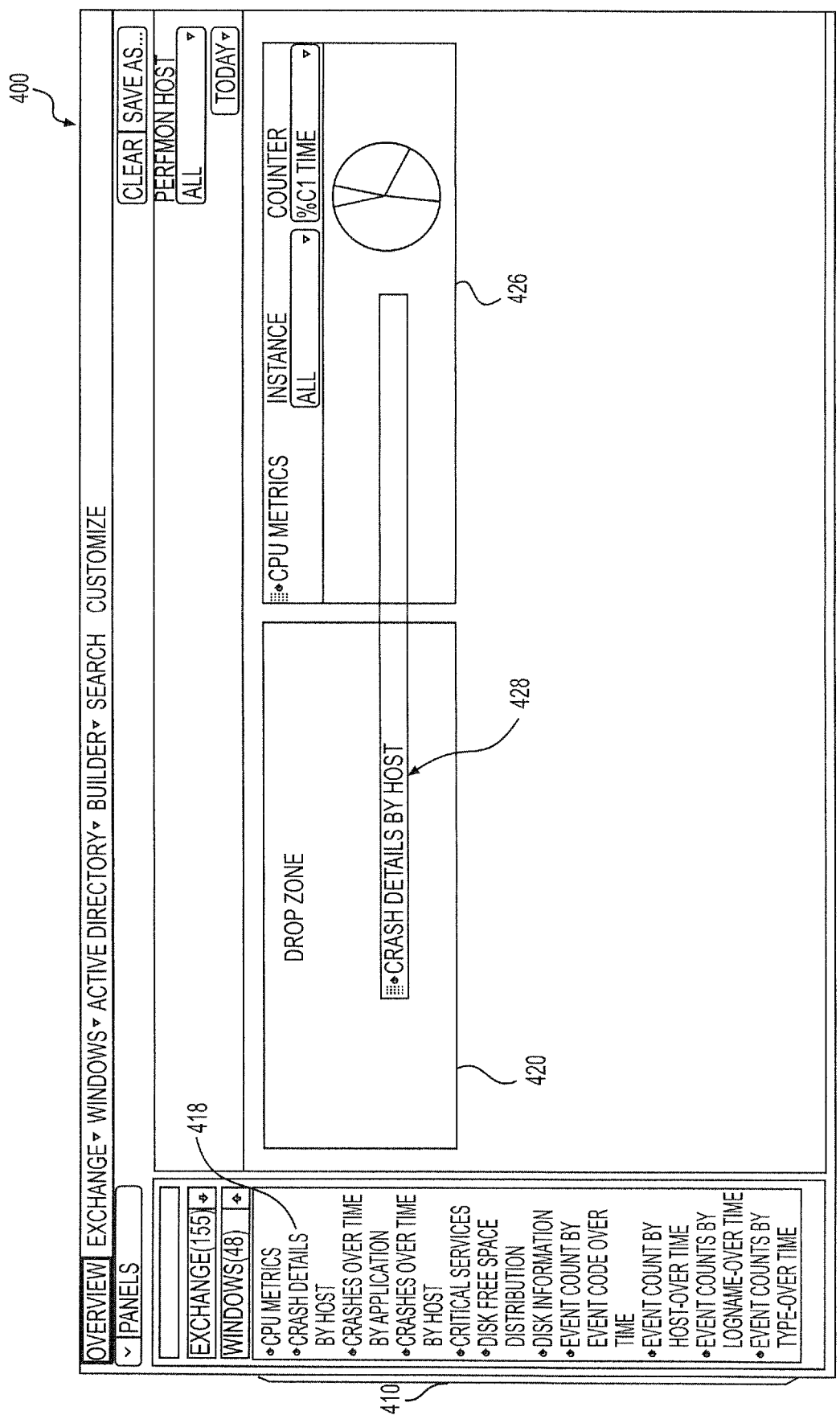
Figure 4F:
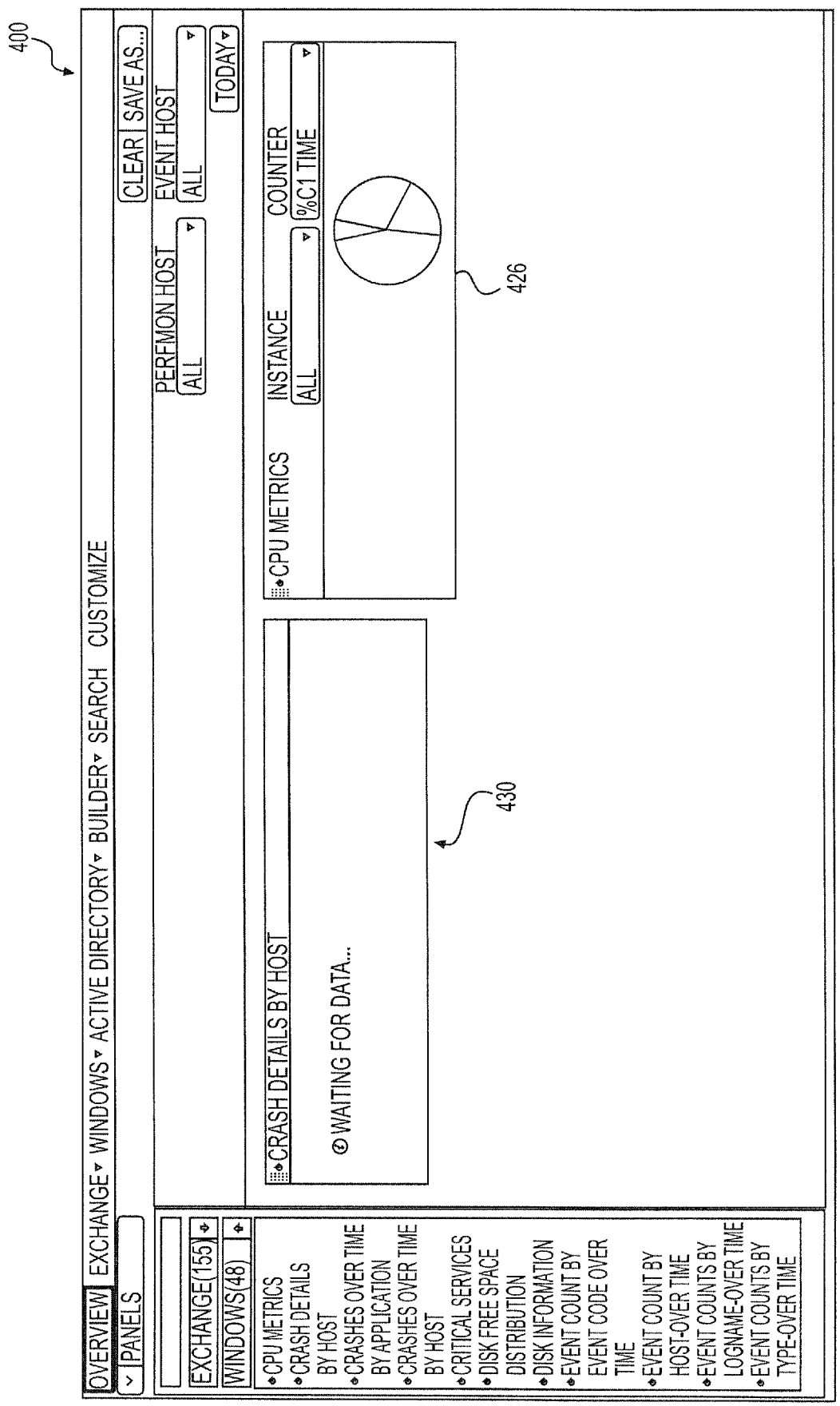
Figure 4G:
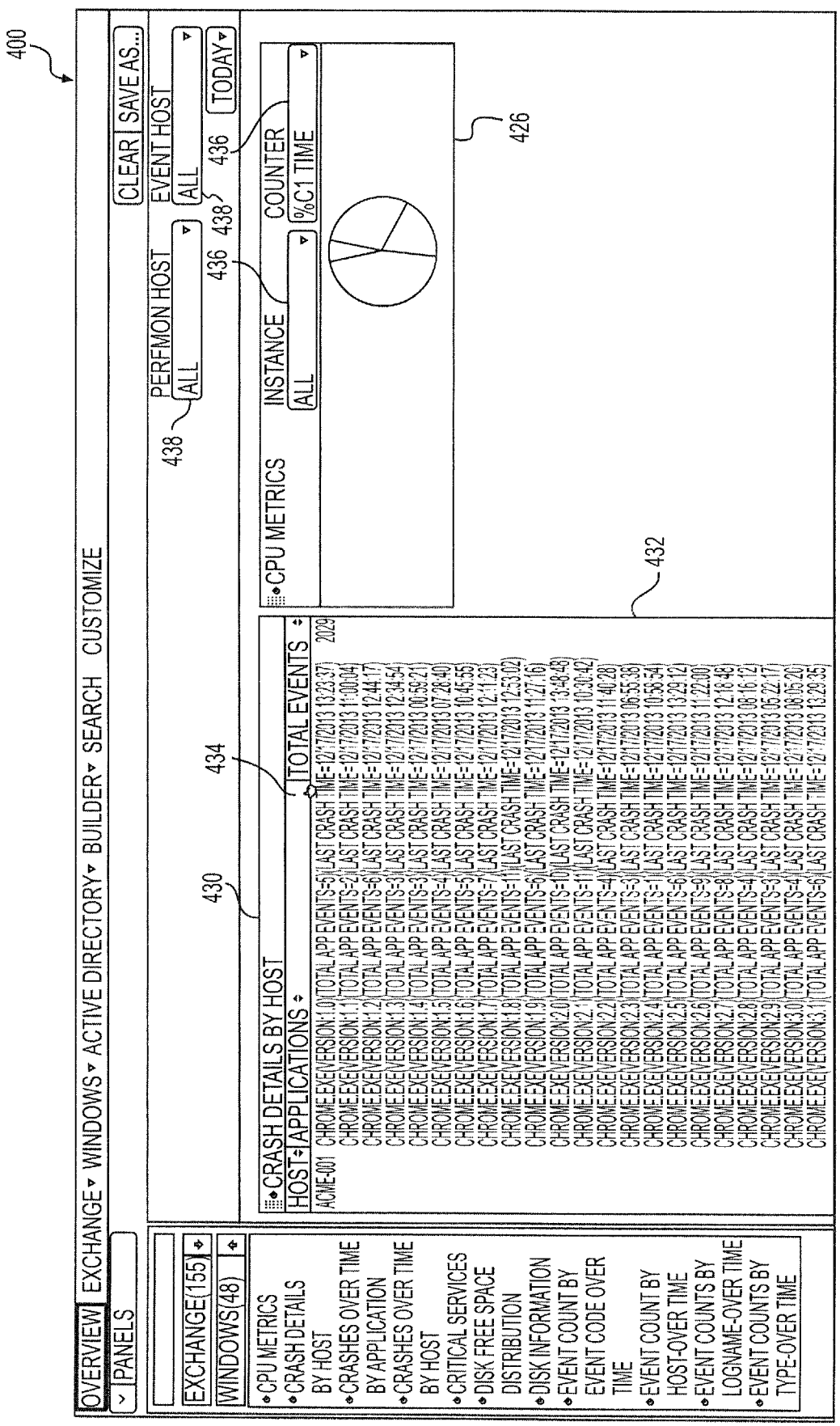

The query and the visualization driven by the query may be updated automatically based on the user's selection. With reference now to FIGS. 4E-4G, the user may add a second panel 428 (and further panels as desired) by dragging and dropping its respective panel indicia 418 from the list of panels 410. The second panel 428 (and subsequent panels) including a query, inputs, and visualization may then be added to drop zone 420 in a similar manner as the first panel, as shown in FIGS. 4A-4D and described above. Specifically, as shown in FIG. 4E, the panel indicia 418 may begin to take the form of a visualization panel 428 upon being dragged over the drop zone 420. As shown in FIG. 4F, visualization panel 428 may expand into visualization panel 430, and a query defined by the panel definition of visualization panel 430 may be executed to identify data to be reflected by the visualization panel 430. As shown in FIG. 4G, the visualization panel 430 then may include a representation of data 432 (in this case shown as a table, as opposed to a chart). As shown in FIG. 4G, a user may manipulate UI or control elements 434 of visualization panel 430 to modify a display of data in visualization panel 430.

Because these inputs do not match inputs in visualization panel 426, they may be referred to as local. Likewise, the user may manipulate UI or control elements 436 of visualization panel 426 to modify a display of data in visualization panel 426, which may also be local to and affect only visualization panel 426. As described above, in some cases, an input to a UI or control element 436 may cause re-running of the query defined by the definition of visualization panel 426 and underlying the displayed data or visualization of visualization panel 426. However, as described above, in some cases, the visualization of visualization panel 426 may update live, in real-time, based on dynamic running of the query.

Also as shown in FIG. 4G, and described above with respect to FIG. 1, the dashboard of GUI 400 may include one or more UI or control elements 438, which may be manipulated to provide and/or modify global inputs that are common to two or more visualization panels in the dashboard. Specifically, as described above, the screenshot of FIG. 4G reflects that the system may have identified inputs "Perfmon Host" and "Event Host" as being inputs that are common between visualization panels 430 and 426, and therefore relocated their respective UI or control elements 438 outside of visualization panels 430 and 426, such as to a global or top area as shown in FIG. 4G.

As described above, it should be appreciated that the user may arrange the visualization panels added to the page according to a desired layout and then select an option to save the page as a new dashboard. For example, the user may change the size, order, layout, shape, color, or other appearance of each visualization panel, such as by dragging the panels, or manipulating with various appearance user elements. Alternatively, such appearance settings or properties associated with each panel added to a dashboard page may be determined automatically, without any further user intervention. In some embodiments, the user may specify one or more of these settings (e.g., the order of a panel within the page layout) and other properties (e.g., the width of each panel relative to other panels) may be determined automatically. The newly created dashboard may be accessible from a list of dashboard pages provided within a menu or different view (not shown) of GUI 400.

In an exemplary embodiment of the present disclosure, a dashboard-creation page provides a graphical user interface enabling a user to define a dashboard. In the dashboard-creation page, the user selects one or more panels for inclusion in the dashboard. Each of the panels is defined by a panel template that specifies both a query and a format for displaying a visualization of data resulting from execution of the query.

Once a user has selected one or more panels in the dashboard-creation page, such as by dragging a label for each selected panel onto a drop-zone area of the dashboard-creation page, indications of the selected panels are displayed in the dashboard-creation page. These indications in the dashboard-creation page of the selected panels can be a representation of what each of the selected panels will look like in the dashboard (in some embodiments, a display of the dashboard is included in the dashboard-creation page, which has additional UI elements enabling the selection of panels and manipulation of what the dashboard will look like when displayed alone), or the indications in the dashboard-creation page of the selected panels can be labels identifying the panels. Moreover, the dashboard-creation page could in some embodiments display, for each of the selected panels, an indication of the query and the visualization format specified in each panel's panel template; where this is done, the dashboard-creation page may optionally enable the user to make edits to or modify the query or the visualization format for any of the panel templates corresponding to selected panels.

The query in a panel template defining a panel may include a search of time-series data, log data, messages, network packet data, performance measurements, sensor measurements, or events (including time-stamped events) derived from any of the foregoing.

The visualization format for displaying the visualization of data specified in a panel's panel template may be a bar chart, a pie chart, a line graph, a scatter plot, a bubble chart, a table, or any other type of data visualization. Additionally, the dashboard-creation page may enable the user to select or alter the layout, sequence, shape, or size for how the selected panels will be displayed in the dashboard. It may enable this, for example, through drag-and-drop methods and resizing elements of the kind sometimes used in graphical user interfaces.

Once a dashboard has been created and/or defined in a dashboard-creation page, including the selection of panels for the dashboard and optionally a layout for the panels, the dashboard may thereafter be displayed alone without any of the GUI elements in the dashboard-creation page that enabled the selection of panels and other manipulations of what the dashboard should look like. This displayed dashboard includes the panels that were selected in the dashboard-creation page.

Each of the panels in the dashboard, in turn, includes a display of the data generated by executing the query in that panel's panel template in the format specified in that panel's panel template. To generate the data to be displayed in a panel, the query is executed. The visualization may be static, where the query is first run and then the visualization of the data is displayed, or the visualization may be dynamic, where the query continues running even after the dashboard is displayed and the visualization in the panel updates in real-time or near real-time.

In addition to having a query and a format for displaying a visualization of data resulting from execution of the query, a panel template may also have definitions for one or more inputs. Each of these inputs may define an aspect of or constrain the query in the panel template (e.g., limiting the data over which the query is executed, limiting a time-range for data over which the query is executed, or specifying specific criteria that the query uses to retrieve data), or they may affect the panel's display of the data generated by executing the query in that panel template (e.g., changing from a bar graph to a pie chart). The definitions for an input may then be used to display a user interface element in the dashboard through which the user can enter an entry for the input. Every input may be local, meaning that it affects only a single panel's query or visualization, or it may be global, meaning that it affects the query or visualization for multiple panels. The user interface element through which a user may submit an entry for an input may appear within the applicable panel for a local input, or it may appear outside the applicable panels for a global input.

A panel template may be associated with, identified by, or referenced by a memory pointer to the panel template or an identifier or tag for the panel template.

Moreover, any of the aforementioned definitions for inputs (global or local) that affect a panel's query or data visualization may also be associated with, identified by, or referenced by a memory pointer to the definition of the input or an identifier or tag for the definition of the input. A particular input may be recognized as a global input where multiple panel templates include the same memory pointer, identifier, or tag to identify one of their inputs.

Figure 5:
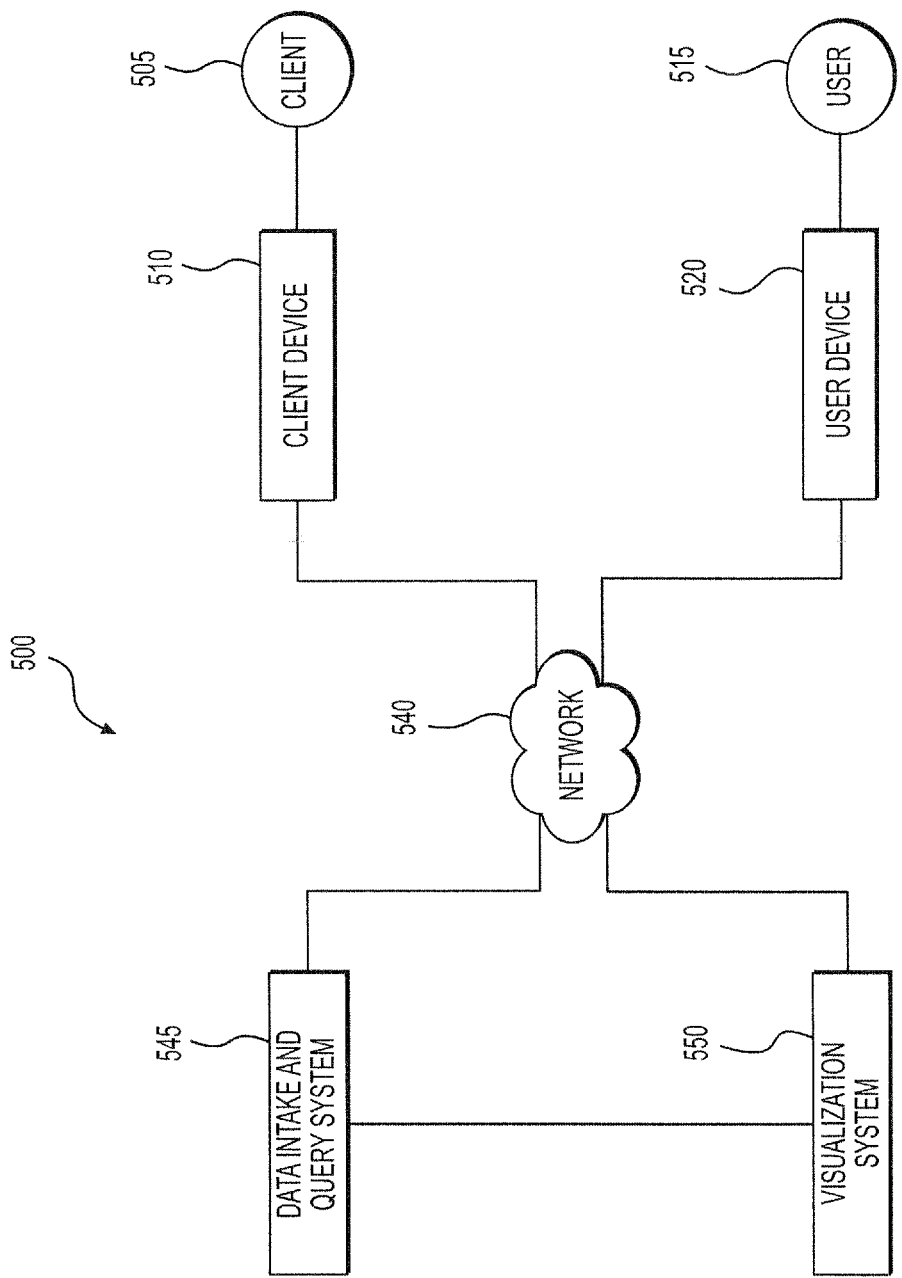
FIG. 5 is a high-level block diagram of an exemplary enterprise network environment suitable for practicing embodiments of the present disclosure.

FIG. 5 is a high-level block diagram of an exemplary enterprise network environment 500 suitable for practicing embodiments of the present disclosure. As shown in FIG. 5, network environment 500 includes a client 505, a client device 510, a user 515, a user device 520, a data intake and query system 545, and a visualization system 550, each of which may be communicatively coupled to each another via, e.g., a network 540. Although only client device 510, user device 520, data intake and query system 545, and visualization system 550 are shown in FIG. 5, it should be noted that network environment 500 may include any additional devices or component systems as desired for a particular implementation.

In the example shown in FIG. 5, each of client device 510 and user device 520 may be any type of computing device having at least one processor and a memory for storing processor-readable instructions and data. Examples of such computing devices include, but are not limited to, a desktop or personal computer, a laptop computer, a netbook computer, a tablet, and a hand-held electronic device, e.g., a smartphone or other type of mobile computing device. However, client device 510 and/or user device 520 may be implemented using a system that includes multiple devices and/or components.

Similarly, data intake query system 545 and visualization system 550 may be implemented using one or more computing devices. In an example, data intake and query system 545 and visualization system 550 may be implemented using one or more servers. Such a server may include, but is not limited to, a web server, a data server, a proxy server, a network server, or other type of server configured to provide data services or exchange electronic information with other servers and other types of computing devices (e.g., client device 510 and user device 520) via network 540.

However, it should be noted that in some implementations, visualization system 550 may be implemented as a component of the client application installed and executable at each of client device 510 and user device 520. In an example, client 505 and user 515 may use the client application executable at their respective devices to generate queries for events based on various criteria that may be specified by client 505 and user 515 via a GUI of the client application. The client application in this example may interact with a search interface to submit queries for data, which in some cases may be machine data, log data, sensor data, network data, mobile data, and/or events derived or rendered from any such data (e.g., events including a user-specified field and occurring within a particular time range of interest). Various visualizations of the query results may be displayed to client 505 and user 515 via the same or different GUI of the client application at client device 510 and user device 520, respectively.

In some implementations, data intake and query system 545 and visualization system 550 may be communicatively coupled to each other via a direct or indirect connection within, for example, a private network that may be accessible through a firewall via network 540. Further, data intake and query system 545 and visualization system 550 may be implemented as components of a single, integrated data management system, e.g., at a server (not shown) within enterprise network environment 500. Alternatively, data intake and query system 545 or visualization system 550 may be implemented as separate components of a distributed system including various computing devices communicatively coupled to one another via network 540. Alternatively, the functionality of some or all of the visualization system 550 could be included in software running on the client device 510 or user device 520.

Network 540 may be any type of electronic network or combination of networks used for communicating digital content and data between various computing devices. Network 540 may include, for example, a local area network, a medium area network, or a wide area network, such as the Internet. In addition, network 540 can include, but is not limited to, a wired (e.g., Ethernet) or a wireless (e.g., Wi-Fi, 3G, or 4G) network. Network 540 can support any of various protocols and technology including, but not limited to, Internet protocols and/or data services. While not shown in FIG. 5, network 540 may include one or more switches, firewalls, routers, gateways, or other types of intermediate network devices used to facilitate communication between various computing devices of network environment 500.

While also not shown in FIG. 5, network environment 500 may further include one or more data stores or repositories for storing machine data and other types of data collected from various data sources, as described above. As will be described in further detail below, the collected machine data and other data may be indexed and/or segmented by data intake and query system 545 into a set of time-stamped events representing, for example, operations, transactions, records, measurements, or readings generated at each data source over a period of time. In an example, one of the data sources may be a web server, and the time-stamped events may correspond to entries within a log file generated by the web server over a given time period. The events in this example may correspond to, for example and without limitation, requests and responses related to web content to and from the web server and one or more computing devices associated with end-users of a service provided by the web server, e.g., via one or more web pages that may be loaded into a web browser executable at each end-user's device.

In an example, client 505 and user 515 may be users of a client application executable at client device 510 and user device 520, respectively. Client 505 may be, for example, a data analyst or systems engineer within an IT department of an enterprise organization, while user 515 may be, for example, a non-technical user within a business operations or marketing department of the enterprise organization.

The client application executable at each device may enable client 505 and user 515 to interact with data intake and query system 545 and/or visualization system 550 for providing panels for visualizing data in a customizable dashboard, as will be described in further detail below. The client application may provide client 505 and user 515 with an interface for accessing the functionality provided by a data management system, e.g., including data intake and query system 545 and visualization system 550 of network environment 500. The interface may be, for example, a GUI for enabling client 505 and user 515 to access the functionality provided by data intake and query system 545 or visualization system 550.

In some implementations, the interface may enable client 505 and user 515 to create a custom dashboard page including a selection of panels including visualizations of data based on queries and inputs defined for each panel, as described above. In an example, visualization system 550 may be used to provide a GUI in the form of a dashboard editor or dashboard-creation page for creating such a custom dashboard, as described above with respect to GUI 400 of FIGS. 4A-4G.

Figure 6A:
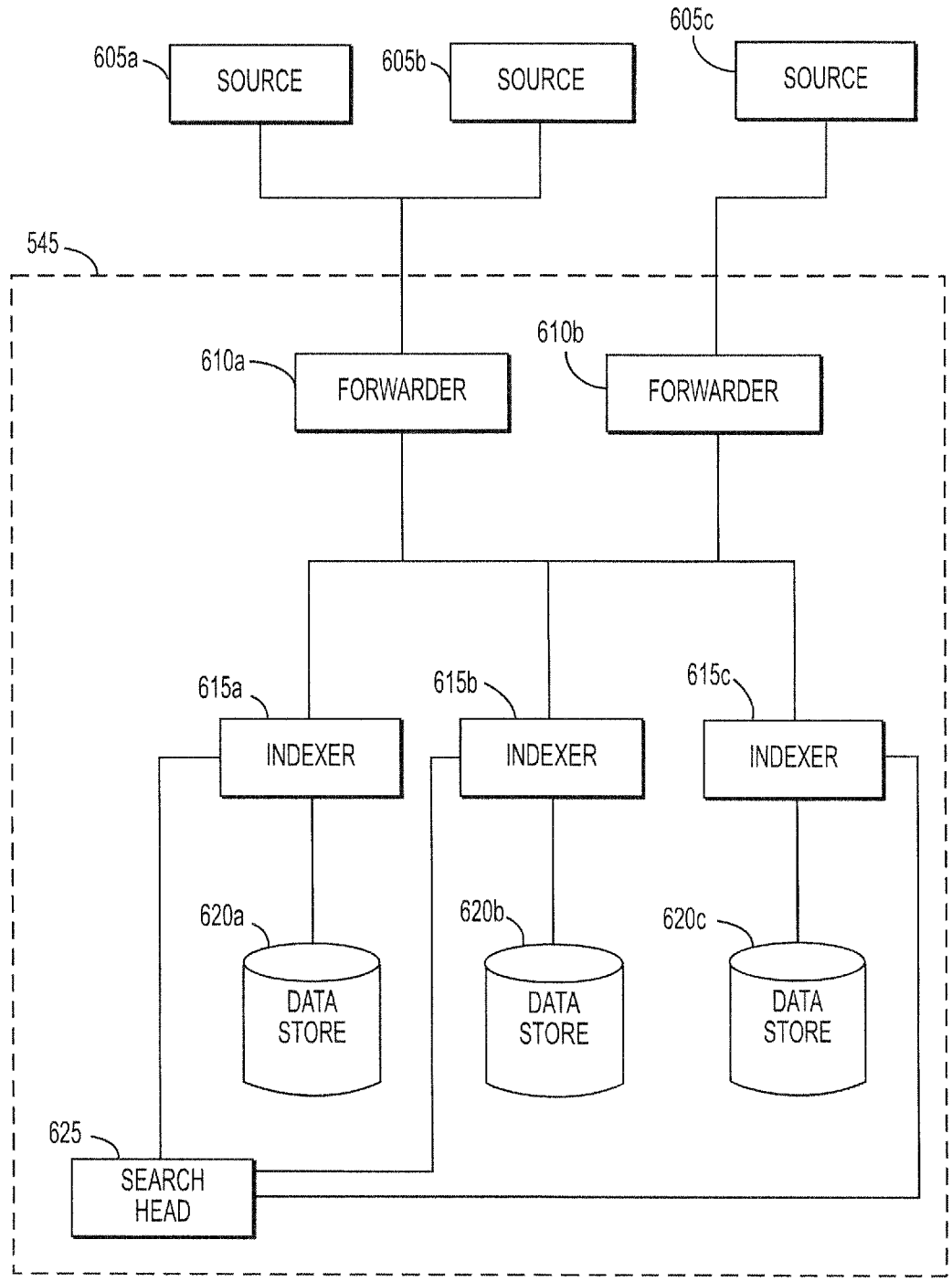
FIG. 6A is a high-level block diagram of an exemplary data intake and query system for indexing collected machine data into events that may be searchable for purposes of data analysis and visualization.

FIG. 6A shows a high-level block diagram of an exemplary data intake and query system 545 for indexing time-series machine data collected from one or more data sources including, for example, any of sources 605a, 605b, and 605c. As shown in FIG. 6A, system 545 may include forwarders 610a and 610b that collect data from sources 605a, 605b, and 605c and forward the data to indexers 615a, 615b, and 615c. However, it should be noted that system 545 could include a greater or fewer number of forwarders and/or indexers, as desired for a particular implementation. Further, system 545 may collect and process machine data or other data from any number of data sources, including additional data sources (not shown) that may be communicatively coupled to forwarder 610a or forwarder 610b or to one or more additional forwarders (not shown) that may be included in system 545. In an example, forwarder 610a may collect and forward streams of time-series machine data or other data generated by sources 605a and 605b to one or more of indexers 615a, 615b, and 615c. Similarly, forwarder 610b may collect and forward the time-series machine data generated by source 605c. It should be noted that the components of system 545, including forwarders 610a and 610b, indexers 615a, 615b, and 615c, and/or search head 625, may be implemented at a single server or across multiple servers or computing devices that are communicatively coupled in a distributed network environment (e.g., servers within a server farm).

Data sources 605a, 605b, and 605c may include computers, routers, databases, operating systems, and applications. Each of data sources 605a, 605b, and 605c may generate one or more different types of machine data including, but not limited to, server logs, activity logs, configuration files, messages, database records, and the like. The machine data or other data produced by data sources 605a, 605b, and 605c may arrive at forwarder 610a or forwarder 610b as, for example, a series of time-stamped records of relevant activities or operations occurring at each data source over time. Further, such time-series machine data may be collected by forwarder 610a or 610b in real-time, e.g., as a real-time data stream or feed to which forwarder 610a or 610b may be subscribed. Alternatively, the machine data may be collected or retrieved by forwarder 610a or 610b from each data source at periodic time intervals.

In the example shown in FIG. 6A, indexers 615a, 615b, and 615c may receive the collected machine data from forwarders 610a and 610b and process the data into events. The events may be searchable and indexed to allow for fast keyword searching. At any time, a schema defining one or more fields within the events may be generated. After generation of the schema, a subsequent search may utilize each field that is defined by specifying search criteria relating to values for that field. The extraction of a value for a field from an event may occur at either index time, storage time, or search time. For field extraction at search time, the schema may be referred to as a "late-binding schema," as will be described in further detail below. The indexed events may be stored within one or more of data stores 620a, 620b, and 620c. As shown in FIG. 6A, system 545 also may include a search head 625 for searching events, and any searches may include criteria for selection of events and any already defined fields included in the events that are stored within data stores 620a, 620b, and 620c. Each of data stores 620a, 620b, and 620c may be implemented using any type of recording medium for storing different types of data accessible to indexers 615a, 615b, and 615c and search head 625. In some implementations, search head 625 may search events and fields in real-time, without having to access data stores 620a, 620b, or 620c. For example, search head 625 may receive real-time streams of indexed event data directly from indexers 615a, 615b, and 615c. In an example, indexers 615a, 615b, and 615c, data stores 620a, 620b, and 620c, and search head 625 may represent different parts of a distributed network environment (e.g., an enterprise network environment) for indexing, storing, and searching events derived from machine data and other data (e.g., mobile or network data) collected from data sources 605a, 605b, and 605c. As will be described in further detail below with respect to the exemplary methods of FIGS. 2 and 3, search head 625 in this example may serve as a centralized search manager or module for handling search-related functions including, but not limited to, directing search requests to a set of search peers, e.g., indexers 615a, 615b, and 615c, and then, merging the results from each search peer for display to the user. Accordingly, search head 625 may be implemented using, for example, a centralized server communicatively coupled to indexers 615a, 615b, and 615c and data stores 620a, 620b, and 620c via a network (e.g., network 540 of FIG. 5, as described above) within the distributed network environment (e.g., enterprise network environment). In one embodiment, the search head may request that each of the various distributed indexers, in parallel, find relevant partial search results responsive to the query, and to return those results to the search head. The search head may aggregate the received partial results to determine a final results set for producing a list of events or visualization of events for display at or to the client. In one embodiment, the assignment of parallel processing of searches to the various distributed indexers on their partial event stores may be referred to as a "map-reduce" process.

As noted above, the components of system 545, including forwarders 610a and 610b, indexers 615a, 615b, and 615c, and/or search head 625, may be implemented at a single server or across multiple servers or computing devices that are communicatively coupled in a distributed network environment. For example, each component may be implemented using a different computing device having at least one processor, a memory, and a network communications interface. Similarly, data stores 620a, 620b, and 620c may be implemented using separate data storage devices that may be accessible to the other components of system 545 via a network. In some implementations, data stores 620a, 620b, and 620c may be coupled to or integrated with indexers 615a, 615b, and 615c, respectively, and the stored data within data stores 620a, 620b, and 620c may be made accessible to search head 625 via an interface provided by each of indexers 615a, 615b, and 615c, respectively.

The features and operations of system 545, including forwarders 610a and 610b, indexers 615a, 615b, and 615c, data stores 620a, 620b, and 620c, and search head 625, and the exemplary methods of FIGS. 2-3 and 4A-4G, may involve data segmentation and query techniques elaborated upon in the following references: Carasso, David. *Exploring Splunk Search Processing Language (SPL) Primer and Cookbook*. New York: CITO Research, 2012; and Ledion Bitincka, Archana Ganapathi, Stephen Sorkin, and Steve Zhang. *Optimizing data analysis with a semi-structured time series database*. In SLAML, 2010. Each of these references is incorporated herein by reference in its entirety.

Figure 6B:
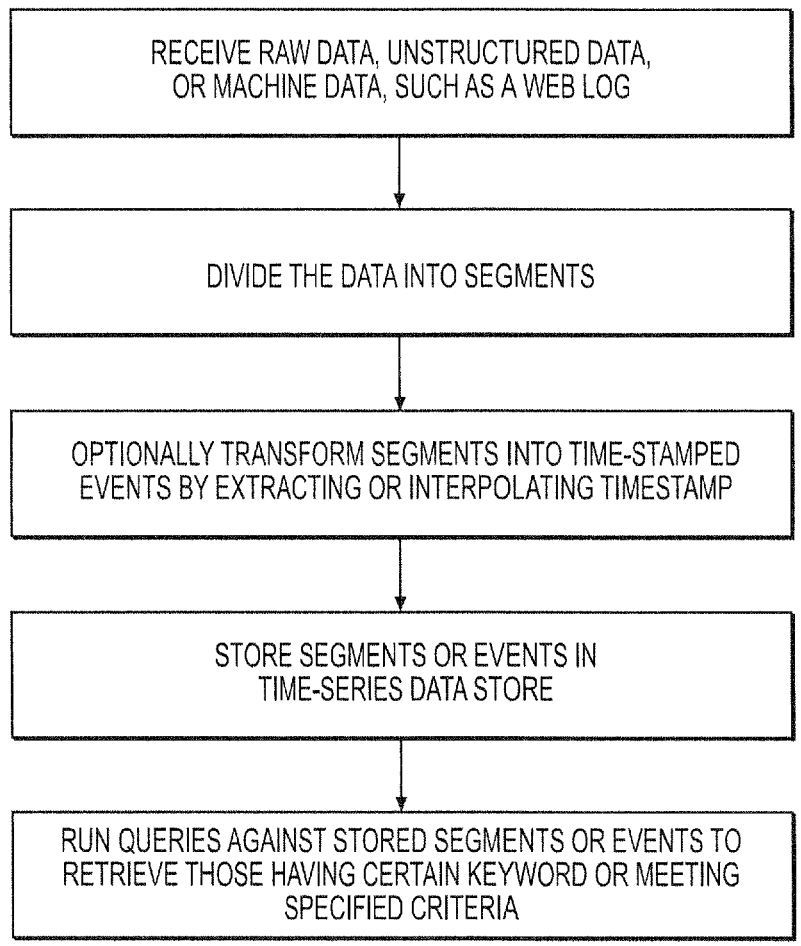
FIG. 6B is a high-level block diagram for segmenting data into events for use in being displayed in panels of a customized dashboard page.

Although the foregoing discussion and exemplary embodiments of the enterprise network environment and systems illustrated in FIGS. 1, 5, and 6 are described in the context of network and/or machine data that may be segmented into discrete events, the present disclosure is not intended to be limited to the analysis of events. In particular, the present disclosure may involve providing visualization and analysis functionality with respect to any type of data including, for example and without limitation, any network traffic data, database data, sensor data, performance metrics associated with a device or component within an enterprise network environment, or any other type of data aggregated from a plurality of sources of data. Examples of such data sources include, but are not limited to, servers or other devices of a distributed network that may be internal or external to a private network of the enterprise.

Further, it should be appreciated that, in certain embodiments, the present disclosure may involve the visualization of data within one or more panels in the form of different types of so-called "events." For example, SPLUNK® ENTERPRISE, which is software produced and sold for on-premise and/or cloud use by Splunk Inc. of San Francisco, Calif., provides an exemplary system for generating, storing, and retrieving events. While SPLUNK® ENTERPRISE can turn almost any time-series data into events of the type that can be analyzed and visualized by the methods of the present disclosure, it has gained particular appeal in the market for deriving events from particular kinds of data: unstructured data, machine data, and/or log data. It is the leading software for providing real-time operational intelligence, enabling organizations to collect, index, and harness the machine-generated big data coming from, among other sources, the websites, applications, servers, networks, mobile devices, and sensors that power their businesses.

At a high level, SPLUNK® ENTERPRISE may take raw data, unstructured data, or machine data, such as a Web log, divide the data into segments, and optionally transform the data in these segments to produce time-stamped events. The software (derives the timestamp for each event by extracting it from the event data itself or by interpolating an event's timestamp relative to other events for which the software can derive a timestamp. SPLUNK® ENTERPRISE then stores the events in a time-series data store against which it can run queries to retrieve events having a certain keyword or meeting specified criteria. For example, system 545 of FIGS. 5 and 6A may receive, divide, and store data according to the flowchart of FIG. 68, for use in the dashboard and visualization panels described above with respect to FIGS. 1-4G.

In SPLUNK® ENTERPRISE, a query often uses a schema to specify criteria for events of interest. As noted, an event in SPLUNK® ENTERPRISE may contain an entire segment of raw data (or transformed version of such). A schema may include one or more fields, each of which may be defined for a subset of the events in the data store and each of which may be associated with an extraction rule specifying how to extract a value for the field from each of the subset of events for which the field has been defined. The extraction rule for a field is often embodied in a regular expression (e.g., a "regex" rule) or any other text extraction protocol/language. Frequently, a field is associated with a logical type of information that is contained within an event for which it is defined, and a field is frequently assigned a name associated with the type of information that appears in the field. A query often specifies the criteria for events of interest in terms of events having specified value(s) for specified field(s).

SPLUNK® ENTERPRISE is particularly noteworthy for employing a so-called late-binding schema. The term "late-binding schema" refers to a system, such as SPLUNK® ENTERPRISE, where the schema need not be defined at index time, as with database technology. Rather, in a system involving late-binding schema, the schema can be developed on an ongoing basis up until and including search time, when a query is executed and applies (i.e., binds) the schema to data, to evaluate the data. As a data analyst learns more about the data in stored events, in a late-binding schema, he/she can continue to develop the schema up until the next time it is needed for a query.

Because SPLUNK® ENTERPRISE maintains the underlying raw data and enables application of a late-binding schema, as compared to databases or data systems that merely store summaries or portions of data, it has greater capability to enable deep exploration of the data to solve problems reflected in the data and answer questions about the data.

Splunk Inc. and third parties also produce a number of applications that run on top of the SPLUNK® ENTERPRISE platform. These applications may (1) provide additional functionality (including data visualizations) for particular SPLUNK® ENTERPRISE use cases, and/or (2) help define schema to make sense of data from particular sources to facilitate the use cases. One such application is the SPLUNK® APP FOR MICROSOFT EXCHANGE, which, among other things, may provide Microsoft Exchange server management functionality including tools for data analysis and visualization. The SPLUNK® APP FOR MICROSOFT EXCHANGE enables users (e.g., system administrators) to monitor system availability and client activity for a Microsoft Exchange system within an enterprise network environment. For example, the SPLUNK® APP FOR MICROSOFT EXCHANGE may be configured to consume logs generated by different servers of the Microsoft Exchange system to provide enterprise users with valuable insight into the health and performance of the system.

The dashboard-creation functionality of the present disclosure may be used in software like the SPLUNK® APP FOR MICROSOFT EXCHANGE, but it should be noted that the techniques of the present disclosure are not intended to be limited to the SPLUNK® APP FOR MICROSOFT EXCHANGE and that these techniques may be used for other applications, which also may be configured to run on top of the SPLUNK® ENTERPRISE platform or may be included in data processing and analytics systems unrelated to any software produced by SPLUNK®. Other examples of such applications or add-ons include, but are not limited to, the SPLUNK® APP FOR MICROSOFT WINDOWS and the SPLUNK® APP FOR MICROSOFT WINDOWS ACTIVE DIRECTORY. Such applications generally may be used in conjunction with the SPLUNK® ENTERPRISE platform for a variety of purposes including, but not limited to, identifying infrastructure problems related to different systems within the enterprise environment, monitoring the performance of one or more servers of a particular system or system group, tracking data flow or network traffic within the environment, monitoring desktop and/or mobile client usage, monitoring security events, and tracking operational trends and patterns for long-term planning.

The examples described above with respect to FIGS. 1-6, or any part(s) or function(s) thereof, may be implemented using hardware, software modules, firmware, tangible computer readable media having instructions stored thereon, or a combination thereof and may be implemented in one or more computer systems or other processing systems.

Figure 7:
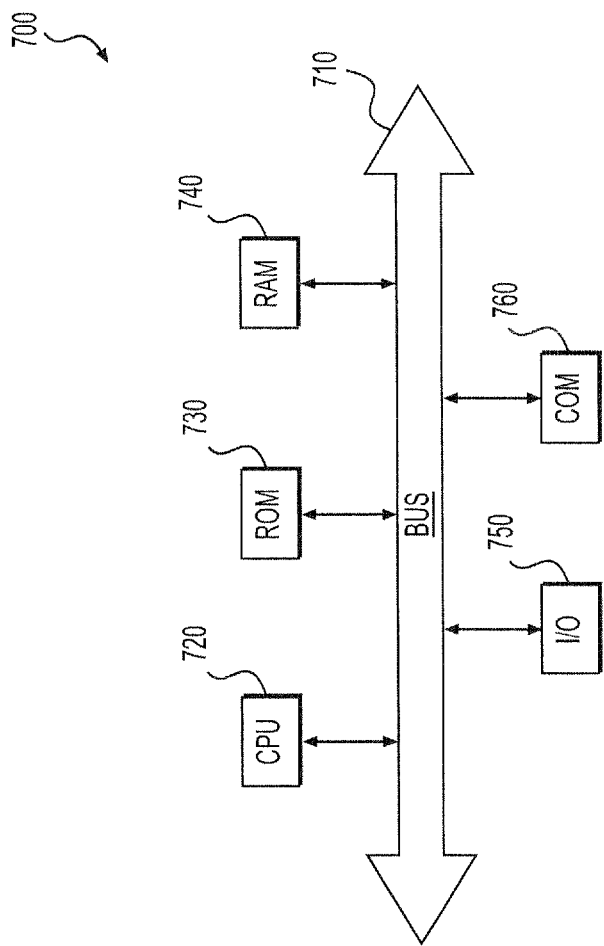
FIG. 7 illustrates an exemplary computer system in which embodiments of the present disclosure may be implemented.

FIG. 7 illustrates a high-level functional block diagram of an exemplary computer system 700, in which embodiments of the present disclosure, or portions thereof, may be implemented, e.g., as computer-readable code. For example, each of the exemplary devices and systems described above with respect to FIGS. 1, 5, and 6 can be implemented in computer system 700 using hardware, software, firmware, tangible computer readable media having instructions stored thereon, or a combination thereof and may be implemented in one or more computer systems or other processing systems. Hardware, software, or any combination of such may embody any of the modules and components in FIGS. 1, 5, and 6A.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure, as described above in the examples of FIGS. 1-6 may be implemented using computer system 700. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 7, computer system 700 includes a central processing unit (CPU) 720. CPU 720 may be any type of processor device including, for example, any type of special purpose or a general purpose microprocessor device. As will be appreciated by persons skilled in the relevant art, CPU 720 also may be a single processor in a multi-core/multiprocessor system, such system operating alone, or in a cluster of computing devices operating in a cluster or server farm. CPU 720 is connected to a data communication infrastructure 710, for example, a bus, message queue, network, or multi-core message-passing scheme. Computer system 700 also includes a main memory 740, for example, random access memory (RAM), and may also include a secondary memory 730.

Secondary memory 730, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 730 may include other similar means for allowing computer programs or other instructions to be loaded into computer system 700. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 700.

Computer system 700 may also include a communications interface ("COM") 760. Communications interface 760 allows software and data to be transferred between computer system 700 and external devices. Communications interface 760 may include a modem, a network interface (such as an Ethernet card), a communications port, a PCMCIA slot and card, or the like. Software and data transferred via communications interface 760 may be in the form of signals, which may be electronic, electromagnetic, optical, or other signals capable of being received by communications interface 760. These signals may be provided to communications interface 760 via a communications path of computer system 700, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Computer system 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In an embodiment, "time-series data" and "time-series machine data" may include, among other things, a series or sequence of data points generated by one or more data sources or computing devices. Each data point may be associated with a time-stamp or be associated with a particular point in time that provides the basis for a time-stamp for the data point, and the series of data points may be plotted over a time range or time axis representing at least a portion of the time range. The data can be structured, unstructured, or semi-structured and can come from files, directories, and/or network events. Unstructured data may refer to data that is not organized according to, for example, a predefined schema to facilitate the extraction of values or fields from the data. Machine data generated by, for example, data sources within an enterprise network environment is generally unstructured data. As described above, the visualization of such time-series data may be used to display statistical trends over time. The time-series machine data collected from a data source may be segmented or otherwise transformed into discrete events, where each event can be associated with a time-stamp.

In an embodiment, an "event" may include a single record of activity from a particular data source associated with a single timestamp. Such an event may correspond to, for example, one or more lines in a log file or other data input. Further, "events" may be derived from processing or indexing machine data, as described elsewhere, or may include the other kinds of events or notable events described elsewhere. Events can also correspond to any time-series data, such as performance measurements of an IT component (e.g., a computer cluster, node, host, or virtual machine), or a sensor measurement.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, this disclosure is not to be considered as limited by the foregoing description. The breadth and scope of the present disclosure should not be limited by any of the above-described exemplary embodiments, but should be defined only in accordance with the following claims and their equivalents. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

What is claimed is:

1. A method comprising:
causing display of a dashboard that includes a plurality of displayed panels, at least one displayed panel of the plurality of displayed panels being derived from a panel template among a plurality of panel templates, wherein the dashboard includes a reference to the panel template but does not include the panel template, wherein each panel template in the plurality of panel templates includes a query and a format used for displaying a data visualization, wherein each panel template is editable to allow editing of the query within the panel template, wherein a change to a query in the panel template causes the dashboard to be updated in response to the change to the query as a result of the reference to the panel template being included in the dashboard; and
wherein causing display of the dashboard further comprises:
for each panel to be displayed as a displayed panel:
retrieving a particular panel template from the plurality of panel templates that is associated with that panel;
executing the query included in the particular panel template to generate query results; and
causing display in that panel of a data visualization of the query results.

2. The method of claim 1, wherein each panel template in the plurality of panel templates includes a definition of an input that (i) defines an aspect of or constrains the query in the panel template, or (ii) that affects a display of query results generated by executing the query in that panel template.

3. The method of claim 1, wherein each panel template in the plurality of panel templates includes a definition of a local input that defines an aspect of or constrains the query in the panel template.

4. The method of claim 1, wherein each panel template in the plurality of panel templates includes a definition of a local input that affects display of query results generated by executing the query in that panel template.

5. The method of claim 1, wherein each panel template associated with the at least one displayed panel in the dashboard each include a same definition of a global input that defines an aspect of or constrains the queries in the associated panel template.

6. The method of claim 1, wherein each panel template associated with the at least one displayed panel includes a same definition of a global input that affects how the at least one displayed panel displays the query results generated by executing the query in the associated panel template.

7. The method of claim 1, wherein a panel template associated with a displayed panel among the at least one displayed panel includes a definition of a local input that is represented by a graphical control element located inside the displayed panel in the dashboard, and wherein an entry for the local input can be received through the graphical control element.

8. The method of claim 1, wherein each panel template associated with the at least one displayed panel includes a same definition of a global input, wherein the global input is represented by a graphical control element located outside the at least one displayed panel, and wherein an entry for the global input can be received through the graphical control element.

9. The method of claim 1, wherein the query included in each panel template in the plurality of panel templates includes a search of time-series data or events derived from any of: log data, messages, network packet data, performance measurements, or sensor measurements.

10. The method of claim 1, wherein the query included in each panel template in the plurality of panel templates corresponds to a search of machine data.

11. The method of claim 1, wherein the query included in each panel template in the plurality of panel templates corresponds to a search of log data.

12. The method of claim 1, wherein the format for displaying the visualization of data specified in each panel template in the plurality of panel templates corresponds to a bar chart, a pie chart, a line graph, a scatter plot, a bubble chart, data visualization, or a table.

13. One or more non-transitory computer-readable storage media, storing one or more sequences of instructions, which when executed by one or more processors cause performance of:
  causing display of a dashboard that includes a plurality of displayed panels, at least one displayed panel of the plurality of displayed panels being derived from a panel template among a plurality of panel templates, wherein the dashboard includes a reference to the panel template but does not include the panel template, wherein each panel template in the plurality of panel templates includes a query and a format used for displaying a data visualization, wherein each panel template is editable to allow editing of the query within the panel template, wherein a change to a query in the panel template causes to be updated in response to the change to the query as a result of the reference to the panel template being included in the dashboard; and;
  wherein the causing of the display of the dashboard further comprises:
    for each panel to be displayed as a displayed panel:
      retrieving a particular panel template from the plurality of panel templates that is associated with that panel;
      executing the query included in the particular panel template to generate query results; and
      causing display in that panel of a data visualization of the query results.

14. The one or more non-transitory computer-readable storage media of claim 13, wherein the query included in each panel template in the plurality of panel templates corresponds to a search of machine data.

15. The one or more non-transitory computer-readable storage media of claim 13, wherein the query included in each panel template in the plurality of panel templates corresponds to a search of log data.

16. The one or more non-transitory computer-readable storage media of claim 13, wherein the format for displaying the visualization of data specified in each panel template in the plurality of panel templates corresponds to a bar chart, a pie chart, a line graph, a scatter plot, a bubble chart, data visualization, or a table.

17. An apparatus comprising:
  a memory having processor-readable instructions stored therein; and
  a processor configured to access the memory and execute the processor-readable instructions, which when executed by the processor, configure the processor to perform a plurality of functions, including functions for:
  causing display of a dashboard that includes a plurality of displayed panels, at least one displayed panel of the plurality of displayed panels being derived from a panel template among a plurality of panel templates, wherein the dashboard includes a reference to the panel template but does not include the panel template, wherein each panel template in the plurality of panel templates includes a query and a format used for displaying a data visualization, wherein each panel template is editable to allow editing of the query within the panel template, wherein a change to a query in the panel template causes to be updated in response to the change to the query as a result of the reference to the panel template being included in the dashboard; and;
  wherein the causing of the display of the dashboard further comprises:
    for each panel to be displayed as a displayed panel:
      retrieving a particular panel template from the plurality of panel templates that is associated with that panel;
      executing the query included in the particular panel template to generate query results; and
      causing display in that panel of a data visualization of the query results.

18. The apparatus of claim 17, wherein the query included in each panel template in the plurality of panel templates corresponds to a search of machine data.

19. The apparatus of claim 17, wherein the query included in each panel template in the plurality of panel templates corresponds to a search of log data.

20. The apparatus of claim 17, wherein the format for displaying the visualization of data specified in each panel template in the plurality of panel templates corresponds to a bar chart, a pie chart, a line graph, a scatter plot, a bubble chart, data visualization, or a table.

* * * * *